United States Patent [19]
Witt et al.

[11] Patent Number: 5,901,302
[45] Date of Patent: * May 4, 1999

[54] SUPERSCALAR MICROPROCESSOR HAVING SYMMETRICAL, FIXED ISSUE POSITIONS EACH CONFIGURED TO EXECUTE A PARTICULAR SUBSET OF INSTRUCTIONS

[75] Inventors: David B. Witt; Thang M. Tran, both of Austin, Tex.

[73] Assignee: Advanced Micro Devices, Inc., Sunnyvale, Calif.

[ * ] Notice: This patent is subject to a terminal disclaimer.

[21] Appl. No.: 08/690,384

[22] Filed: Jul. 26, 1996

Related U.S. Application Data

[63] Continuation-in-part of application No. 08/377,843, Jan. 25, 1995, abandoned, and application No. 08/476,879, Jun. 7, 1995, abandoned.

[51] Int. Cl.$^6$ ...................................................... G06F 9/38
[52] U.S. Cl. ........................................... 395/391; 395/394
[58] Field of Search ...................................... 395/384, 386, 395/390, 391, 392, 393, 394, 800.23, 800.41, 382, 388, 389

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 0 724 213 A2 | 7/1996 | European Pat. Off. . |
| 2263985 | 8/1993 | United Kingdom . |
| 2263987 | 8/1993 | United Kingdom . |
| 2281422 | 3/1995 | United Kingdom . |
| 97/13201 | 4/1997 | WIPO . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMB K6 Takes On Intel P6," BYTE, Jan. 1996, 4 pages.
Gaddis, et al, "FP 13.2: A 56 Entry Instruction Reorder Buffer," ISSCC96/Session 13/Microprocessors/Paper FP. 13.2, 1996 IEEE International Solid–State Circuits Conference, pp. 212–213, 447.
Wallace, et al, "Design and Implementation of a 100 MHz Reorder Buffer," Department of Electrical and Computer Engineering, University of California, Irvine, 0–7803–2428–May 1995, 1995, IEEE, pp. 42–45.
Lenell, John, "A 20MHz CMOS Reorder Buffer for a Superscalar Microprocessor," $4^{th}$ NASA Symposium on VLSI Design, 1992, pp. 2.3.1–2.3.12.

Primary Examiner—Parshotam S. Lall
Assistant Examiner—Viet Vu
Attorney, Agent, or Firm—Conley, Rose & Tayon; Lawrence J. Merkel; B. Noel Kivlin

[57] ABSTRACT

A microprocessor employing a reorder buffer is configured with fixed, symmetrical issue positions. The symmetrical nature of the issue positions may increase the average number of instructions to be concurrently dispatched and executed by the microprocessor. In one embodiment, the reorder buffer allocates a line of storage sufficient to store instruction results corresponding to a maximum number of concurrently dispatchable instructions regardless of the number actually dispatched. The average number of unused locations within the line decreases as the average number of concurrently dispatched instructions increases.

23 Claims, 13 Drawing Sheets

U.S. PATENT DOCUMENTS

| | | | |
|---|---|---|---|
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/586 |
| 5,197,132 | 3/1993 | Steely, Jr. et al. | 395/393 |
| 5,226,126 | 7/1993 | McFarland et al. | 395/394 |
| 5,226,130 | 7/1993 | Favor et al. | 395/585 |
| 5,233,694 | 8/1993 | Hotta et al. | 395/391 |
| 5,345,569 | 9/1994 | Tran | 395/393 |
| 5,355,457 | 10/1994 | Shebanow et al. | 395/394 |
| 5,430,851 | 7/1995 | Hirata et al. | 395/388 |
| 5,524,263 | 6/1996 | Griffth et al. | 395/800.23 |
| 5,535,346 | 7/1996 | Thomas, Jr. | 395/393 |
| 5,560,032 | 9/1996 | Nguyen et al. | 395/800.23 |
| 5,574,935 | 11/1996 | Vidwans et al. | 395/800.23 |
| 5,584,038 | 12/1996 | Papworth et al. | 395/800.23 |
| 5,623,628 | 4/1997 | Brayton et al. | 711/141 |
| 5,632,023 | 5/1997 | White et al. | 395/394 |
| 5,689,720 | 11/1997 | Nguyen et al. | 395/376 |
| 5,737,624 | 4/1998 | Garg et al. | 395/800.23 |

132 →

Branch Misprediction
CSSEL[15:0]
Floating Point
FPOPC[10:0]
FSYNC
Last1
Last2
Linetag1[4:0]
Linetag2[4:0]
LineOffset1[3:0]
LineOffset2[3:0]
MROM
NoMisp
PC1[31:0]
PC2[31:0]
PCSHFT
VLTAG[3:0]
VLTAGP[3:0]

FIG. 9

SUPERSCALAR MICROPROCESSOR HAVING SYMMETRICAL, FIXED ISSUE POSITIONS EACH CONFIGURED TO EXECUTE A PARTICULAR SUBSET OF INSTRUCTIONS

CROSS REFERENCE TO RELATED APPLICATIONS

This application is a continuation-in-part of patent application Ser. No. 08/377,843 filed Jan. 25, 1995, now abandoned and patent application Ser. No. 08/476,879 filed Jun. 7, 1995, now abandoned.

BACKGROUND OF THE INVENTION

1. Field of the Invention

This invention is related to the field of superscalar microprocessors and, more particularly, to reorder buffers within superscalar microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor.

Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

In order to increase performance, superscalar microprocessors often employ out of order execution. The instructions within a program are ordered, such that a first instruction is intended to be executed before a second instruction, etc. When the instructions are executed in the order specified, the intended functionality of the program is realized. However, instructions may be executed in any order as long as the original functionality is maintained. For example, a second instruction which does not depend upon a first instruction may be executed prior to the first instruction, even if the first instruction is prior to the second instruction in program order. A second instruction depends upon a first instruction if a result produced by the first instruction is employed as an operand of the second instruction. The second instruction is said to have a dependency upon the first instruction.

Another hazard of out of order execution occurs when two instructions update the same destination storage location. If the instruction which is second in the original program sequence executes first, then that instruction must not update the destination until the first instruction has executed. Often, superscalar microprocessors employ a reorder buffer in order to correctly handle dependency checking and multiple updates to a destination, among other things. Instructions are stored into the reorder buffer in program order, typically as the instructions are dispatched to execution units (perhaps being stored in reservation stations associated therewith). The results of the instructions are stored into the destinations from the reorder buffer in program order. However, results may be provided to the reorder buffer in any order. The reorder buffer stores each result with the instruction which generated the result until that instruction is selected for storing its result into the destination.

A reorder buffer is configured to store a finite number of instructions, defining a maximum number of instructions which may be concurrently outstanding within the superscalar microprocessor. Generally speaking, out of order execution occurs more frequently as the finite number is increased. For example, the execution of an instruction which is foremost within the reorder buffer in program order may be delayed. Instructions subsequently dispatched into the reorder buffer which are not dependent upon the delayed instruction may execute and store results in the buffer. Out of order execution may continue until the reorder buffer becomes full, at which point dispatch is suspended until instructions are deleted from the reorder buffer. Therefore, a larger number of storage locations within the reorder buffer generally leads to increased performance by allowing more instructions to be outstanding before instruction dispatch (and out of order execution) stalls.

Unfortunately, larger reorder buffers complicate dependency checking. One or more source operands of an instruction to be dispatched may be destination operands of outstanding instructions within the reorder buffer. As used herein, a source operand of an instruction is a value to be operated upon by the instruction in order to produce a result. Conversely, a destination operand is the result of the instruction. Source and destination operands of an instruction are generally referred to as operand information. An instruction specifies the location storing the source operands and the location in which to store the destination operand. An operand may be stored in a register (a "register operand") or a memory location (a "memory operand"). As used herein, a register is a storage location included within the microprocessor which is used to store instruction results. Registers may be specified as source or destination storage locations for an instruction.

The locations from which to retrieve source operands for an instruction to be dispatched are compared to the locations designated for storing destination operands of instructions stored within the reorder buffer. If a dependency is detected and the corresponding instruction has executed, the result stored in the reorder buffer may be forwarded for use by the dispatching instruction. If the instruction has not yet executed, a tag identifying the instruction may be forwarded such that the result may be provided when the instruction is executed.

When the number of instructions storable in the reorder buffer is large, the number of comparisons for performing dependency checking is also large. Generally speaking, the total number of comparisons which must be provided for is the number of possible operands of an instruction multiplied by the number of instructions which may be concurrently dispatched, further multiplied by the number of instructions which may be stored in the reorder buffer. Additionally, more than one destination operand within the reorder buffer may be stored within the storage location indicated for a source operand. Circuitry is therefore employed to detect the last of the destination operands indicated by the comparisons, in order to correctly detect the dependency (i.e. the instruction which stores a result into a storage location used for a source operand and which is nearest to the dispatching instruction in program order is the instruction upon which the dispatching instruction depends). It is desirable to reduce the complexity of dependency checking for reorder buffers.

Still further, reorder buffers typically allocate a storage location for each instruction dispatched during a particular clock cycle. The number of storage locations allocated varies from clock cycle to clock cycle depending upon the number of instructions dispatched. Additionally, a variable number of instructions may be retired from the reorder buffer. Logic for allocating and deallocating storage locations is complicated by the variable nature of storage access, creating a larger and typically slower control unit used in the reorder buffer. A faster, simpler method for allocating reorder buffer storage is desired.

SUMMARY OF THE INVENTION

The problems outlined above are in large part solved by a reorder buffer in accordance with the present invention. The reorder buffer is configured into multiple lines of storage, wherein a line of storage includes sufficient storage for instruction results and information regarding a predefined maximum number of concurrently dispatchable instructions. A line of storage is allocated whenever one or more instructions are dispatched. Advantageously, the amount of storage allocated is constant. Therefore, storage allocation logic depends only upon whether or not instructions are dispatched during a clock cycle. In particular, allocation logic is independent of the number of instructions dispatched during a clock cycle. Allocation logic may thereby be simplified, allowing for higher frequency applications.

Similarly, instructions are retired from the reorder buffer after each of the instructions within a line of storage have provided results. The instructions within the line are retired simultaneously. Therefore, the amount of storage deallocated during a clock cycle is dependent only upon whether or not instructions are retired during the clock cycle, not upon the number of instructions retired. Advantageously, storage deallocation logic may be simplified as well.

In one embodiment, a microprocessor employing the reorder buffer is also configured with fixed, symmetrical issue positions. The symmetrical nature of the issue positions may increase the average number of instructions to be concurrently dispatched and executed by the microprocessor. Since the issue positions are symmetrical, any random group of instructions executable by the issue positions may be dispatched to the issue positions. In contrast, asymmetrical issue positions may impose additional restrictions upon the concurrent dispatch and execution of instructions. Increasing the average number of concurrently dispatched instructions may be particularly beneficial when employed with the line-oriented reorder buffer, since a line of storage is allocated regardless of the number of instructions dispatched. The average number of unused locations within the line decreases as the average number of concurrently dispatched instructions increases.

One particular implementation of the reorder buffer includes a future file for reducing dependency checking complexity. The future file replaces the large block of comparators and prioritization logic ordinarily employed by reorder buffers for dependency checking. The future file includes a storage location corresponding to each register within the microprocessor. The reorder buffer tag (or instruction result, if the instruction has executed) of the last instruction in program order to update the register is stored in the future file. The reorder buffer provides the value (either reorder buffer tag or instruction result) stored in the storage location corresponding to a register when the register is used as a source operand for another instruction.

Another advantage of the future file for microprocessors which allow access and update to portions of registers is that narrow-to-wide dependencies are resolved upon completion of the instruction which updates the narrower register. Previously, the instruction which updates the narrower register might typically be retired prior to resolving the narrow-to-wide dependency. Generally, instruction retirement occurs subsequent to completion of the instruction. Performance of the microprocessor may be increased due to the earlier resolution of the narrow-to-wide dependencies.

Broadly speaking, the present invention contemplates a reorder buffer comprising an instruction storage and a first control unit. The instruction storage includes multiple lines of storage, wherein each of the lines of storage is configured to store a predefined maximum number of instructions concurrently receivable by the reorder buffer. Coupled to the instruction storage, the first control unit is configured to allocate one of the lines of storage to one or more concurrently received instructions. One of the lines of storage is allocated regardless of a number of the concurrently received instructions.

The present invention further contemplates an apparatus for reordering instructions which were executed out of order, comprising a first decode unit, a second decode unit, and a reorder buffer. The first decode unit is configured to decode and dispatch a first instruction. Similarly, the second decode unit is configured to decode and dispatch a second instruction concurrent with the first instruction. Coupled to both the first decode unit and the second decode unit, the reorder buffer is configured to allocate a line of storage to store instruction results corresponding to the first instruction and the second instruction upon dispatch of the first instruction and the second instruction. The line of storage is configured to store a maximum number of concurrently dispatchable instructions and is allocated regardless of a number of concurrently dispatched instructions provided at least one instruction is dispatched.

The present invention still further contemplates a method for operating a reorder buffer. Up to a predefined maximum number of concurrently dispatched instructions are received into the reorder buffer. Upon receipt of the concurrently dispatched instructions, a fixed amount of storage is allocated for instruction results. The fixed amount of storage is sufficient to store the maximum number of concurrently dispatched instructions regardless of a number of concurrently dispatched instructions. The fixed amount of storage is subsequently deallocated upon receipt of an instruction result corresponding to each of the concurrently dispatched instructions.

The present invention additionally contemplates a method for ordering instructions in a microprocessor employing out of order execution. Up to a maximum number of instructions are concurrently dispatched. A line of storage is allocated within a reorder buffer for storing instruction results corresponding to the instructions which are concurrently dispatched. The line of storage is configured to store a number of instruction results equal to the maximum number of instructions. The instructions are executed in a plurality of functional units. Upon execution, corresponding instruction results are provided to the reorder buffer. The line of storage is deallocated when each of the corresponding instruction results within the line of storage have been provided.

The present invention also contemplates a superscalar microprocessor comprising a plurality of fixed, symmetrical issue positions and a reorder buffer. The plurality of fixed, symmetrical issue positions is coupled to receive instructions. An instruction received by one of the plurality of issue positions remains within that one of the plurality of issue positions until the instruction is executed therein. Coupled to receive operand information regarding a plurality of concurrently dispatched instructions from the plurality of fixed, symmetrical issue positions, the reorder buffer is configured to allocate storage for instruction results corresponding to the plurality of concurrently dispatched instructions.

Furthermore, the present invention contemplates a superscalar microprocessor comprising a first and second decode unit, a first and second reservation station, and a reorder buffer. The first decode unit is configured to decode a first instruction. Similarly, the second decode unit is configured to decode a second instruction concurrently with the first decode unit decoding the first instruction. Coupled to receive the first instruction from the first decode unit, the first reservation station is configured to store the first instruction until the first instruction is executed. Likewise, the second reservation station is coupled to receive the second instruction from the second decode unit and to store the second instruction until the second instruction is executed. The reorder buffer is coupled to the first decode unit and the second decode unit, and receives an indication of the first instruction and the second instruction from the first decode unit and the second decode unit, respectively. Additionally, the reorder buffer is configured to allocate a line of storage to store a first instruction result corresponding to the first instruction and a second instruction result corresponding to the second instruction. The line of storage comprises a fixed amount of storage capable of storing instruction results corresponding to a maximum number of concurrently dispatchable instructions.

Moreover, the present invention contemplates a reorder buffer comprising an instruction storage, a future file, and a control unit. The instruction storage is configured to store instruction results corresponding to instructions. The instruction results are stored in lines of storage, wherein a line of storage is configured to store instruction results corresponding to a maximum number of concurrently dispatchable instructions. A first line of storage is allocated upon dispatch of at least one instruction regardless of a number of instructions concurrently dispatched. The future file is configured to store a reorder buffer tag corresponding to a particular instruction. The particular instruction is last, in program order, of the instructions represented within the instruction storage having a particular register as a destination operand. Additionally, the future file is further configured to store a particular instruction result corresponding to the particular instruction when the particular instruction result is provided. Coupled to the instruction storage and the future file, the control unit is configured to allocate the first line of storage for at least one instruction. Still further, the control unit is configured to update the future file if the instruction has the particular register as a destination operand.

The present invention yet further contemplates a reorder buffer comprising a future file, an instruction storage, and a control unit. The future file has a storage location for each register implemented by a microprocessor employing the reorder buffer. The storage location is divided into a first portion and a second portion, corresponding to a first portion and a second portion of the register, respectively. Each of the first and second portions of the storage location is configured to store a reorder buffer tag of an instruction which updates the corresponding portion the register. Additionally, each of the first and second portions of the storage location is configured to store data corresponding to an instruction result of the instruction identified by the reorder buffer tag, wherein the data replaces the reorder buffer tag when the data is provided. The instruction storage is configured to store instruction results corresponding to multiple instructions outstanding within the microprocessor. Coupled to the future file and the instruction storage, the control unit is configured to allocate storage within the instruction storage upon dispatch of at least one instruction. Still further, the control unit is configured to store a first reorder buffer tag into the first portion of the storage location if at least one instruction updates the first portion of the register. Similarly, the control unit is further configured to store the first reorder buffer tag into the second portion of the storage location if at least one instruction updates the second portion of the register.

The present invention additionally contemplates a microprocessor comprising a reorder buffer and a register file. The reorder buffer includes a future file having a storage location for each register implemented by the microprocessor. The storage location is divided into a first portion and a second portion, wherein the first portion of the storage location corresponds to a first portion of the register and the second portion of the storage location corresponds to a second portion of the register. Each of the first portion of the storage location and the second portion of the storage location is configured to store a reorder buffer tag of an instruction which updates the first portion of the register and the second portion of the register, respectively. Still further, each of the first and second portions of the storage location is configured to store data corresponding to an instruction result of the instruction identified by the reorder buffer tag, respectively. The data replaces the reorder buffer tag when the data is provided. Coupled to the reorder buffer, the register file is configured to store a plurality of values corresponding to the registers implemented by the microprocessor. The reorder buffer updates the register file upon retirement of the instruction.

BRIEF DESCRIPTION OF THE DRAWINGS

Other objects and advantages of the invention will become apparent upon reading the following detailed description and upon reference to the accompanying drawings in which:

FIG. 9 is a table of information shared by the instructions within a line of storage according to one embodiment of the reorder buffer shown in FIG. 4.

Figure 1:
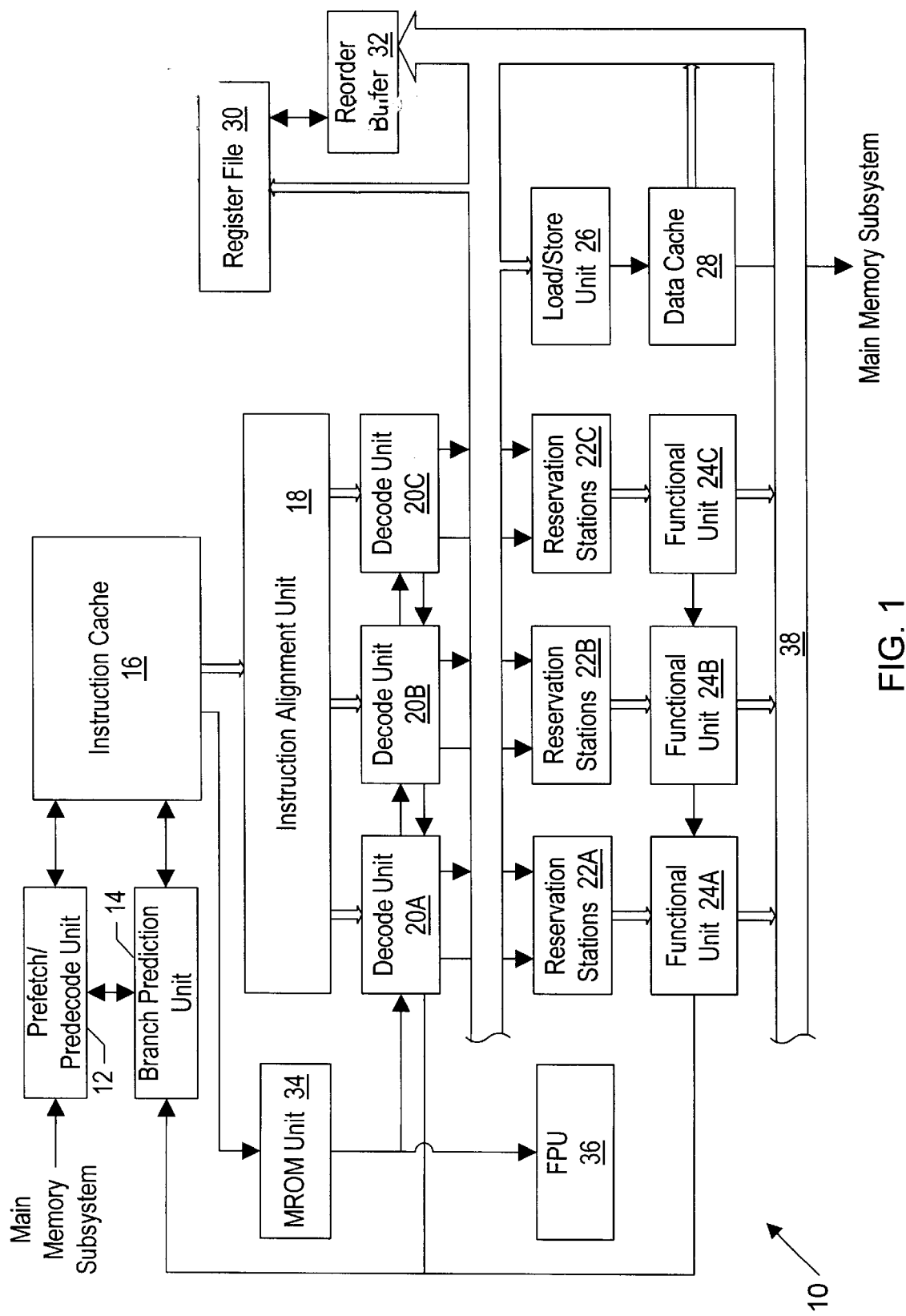
FIG. 1 is a block diagram of one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20 and to FPU 36.

Generally speaking, reorder buffer 32 allocates a line of storage to store instruction information and instruction results for one or more instructions which are concurrently dispatched by microprocessor 10. The line of storage is sufficient for storing such information and results for a maximum number of concurrently dispatchable instructions within microprocessor 10. The line of storage is allocated regardless of the number of instructions actually concurrently dispatched (as long as at least one instruction is dispatched). During subsequent clock cycles, different lines of storage are allocated to the subsequently dispatched instructions. Additionally, instructions within a line of storage are concurrently retired from reorder buffer 32 as well. Advantageously, storage allocation within reorder buffer 32 is simplified. A fixed amount of storage is allocated each time instructions are dispatched, regardless of the number of instructions. Still further, a fixed amount of storage is deallocated upon retirement of instructions. Allocation logic is thereby dependent only upon successful dispatch of one or more instructions, not upon the number of instructions concurrently dispatched.

Microprocessor 10 employs a plurality of symmetrical issue positions for executing instructions dispatched by instruction alignment unit 18. The issue positions are symmetrical in that each issue position is configured to execute the same subset of the instruction set employed by microprocessor 10 as each other issue position. In one embodiment, each issue position is configured to execute the integer and branch instructions of the x86 microprocessor architecture. In one particular embodiment, each issue position is configured to execute the fast path instructions. Other embodiments may define other subsets for the symmetrical issue positions. Additionally, the issue positions are fixed in that, once an instruction is provided to an issue position, that instruction remains within that issue position until it is executed.

In one specific implementation, reorder buffer 32 employs a future file to simplify dependency checking. The future file includes a storage location for each register employed by microprocessor 10. The storage location is updated upon dispatch of an instruction which updates the register, and is further updated upon receipt of the instruction result corresponding to the instruction provided that a subsequent instruction is not dispatched which updates the register. Upon dispatch, the reorder buffer tag identifying the instruction is stored into the future file. Upon receipt of the instruction result, that result is stored into the future file. Therefore, the future file contains information (either reorder buffer tag or instruction result) corresponding to the last instruction (in program order) to update the register. Advantageously, the reorder buffer tag or register value which is to be provided when the register is used as a source operand of an instruction may be read from the corresponding storage location within the future file. It is noted that embodiments of reorder buffer 32 which do not employ a future file are contemplated.

In one embodiment of the future file, the storage location allocated to the register stores either the reorder buffer tag corresponding to the instruction which updates the register or the corresponding instruction result. In other words, the reorder buffer tag and register value overwrite each other within the storage location. In the x86 microprocessor architecture, an instruction may use a portion of a register for a source or destination operand. For example, the EAX register is 32 bits. However, the least significant 16 bits of the EAX register may be accessed as the AX register. Additionally, the most significant 8 bits of the AX register may be accessed as the AH register and the least significant eight bits of the AX register may be accessed as the AL register. Therefore, multiple instructions may be outstanding which update different portions of the register. For such an embodiment, the future file storage location is configured to store multiple tags or the corresponding data. When an instruction uses a portion of the register as a source operand, the reorder buffer tag of the last instruction which updates that portion of the register is provided. Alternatively, if the instruction has been executed and has produced a result, the result is provided for that portion of the register.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| Start bits | 10000 |
|---|---|
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C. Generally speaking, an issue position refers to a block of circuitry configured to properly execute an instruction. An issue position receives an instruction and executes that instruction within the issue position.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded nstructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Therefore, the functional units 24 are symmetrical functional units. It is noted that floating point unit 36 is also be employed to accommodate floating point operations. Floating point unit 36 may be operated as a coprocessor, receiving instructions from MROM unit 34. FPU 36 may then communicate with reorder buffer 32 for completing instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
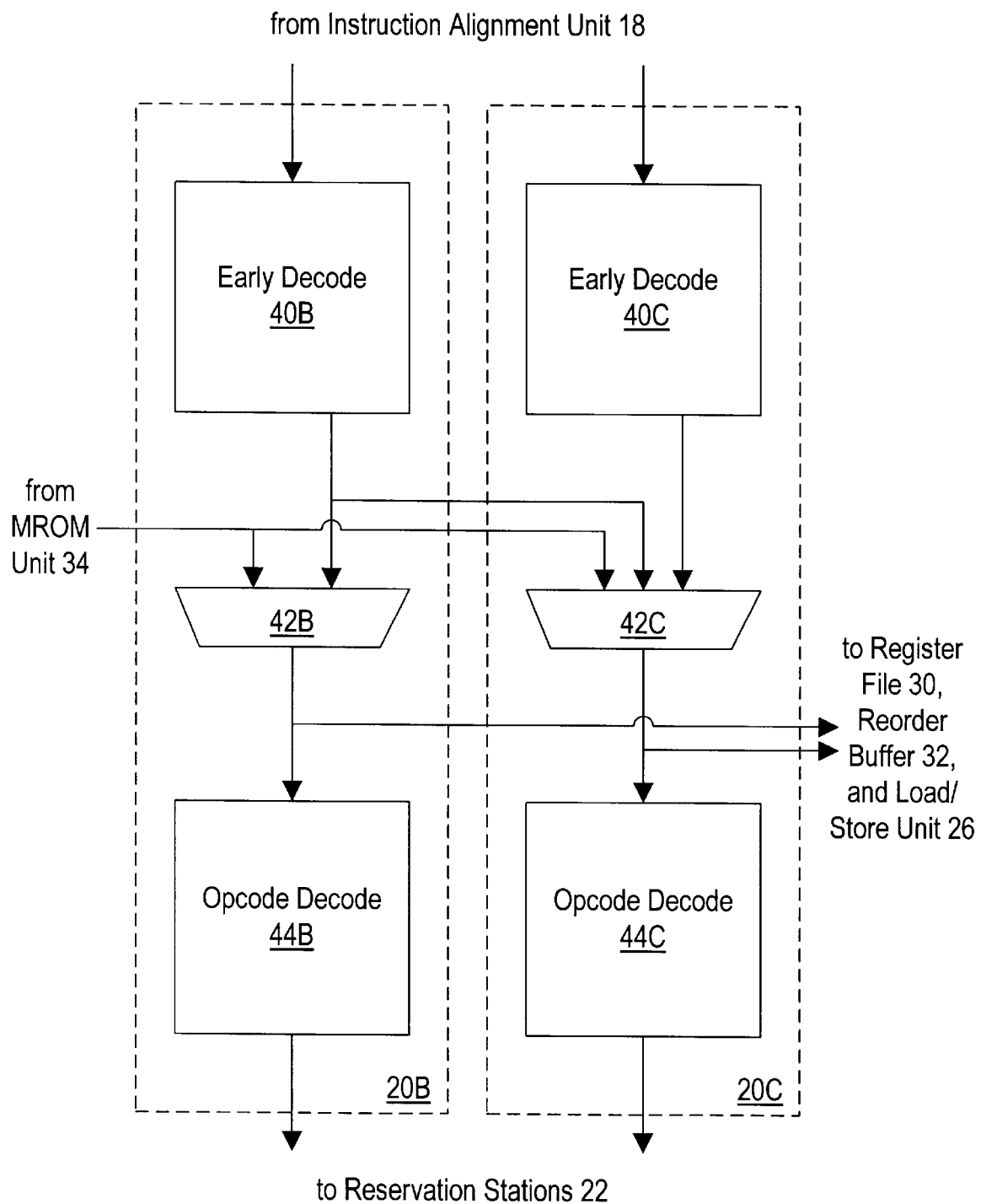
FIG. 2 is a block diagram of one embodiment of two of the decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
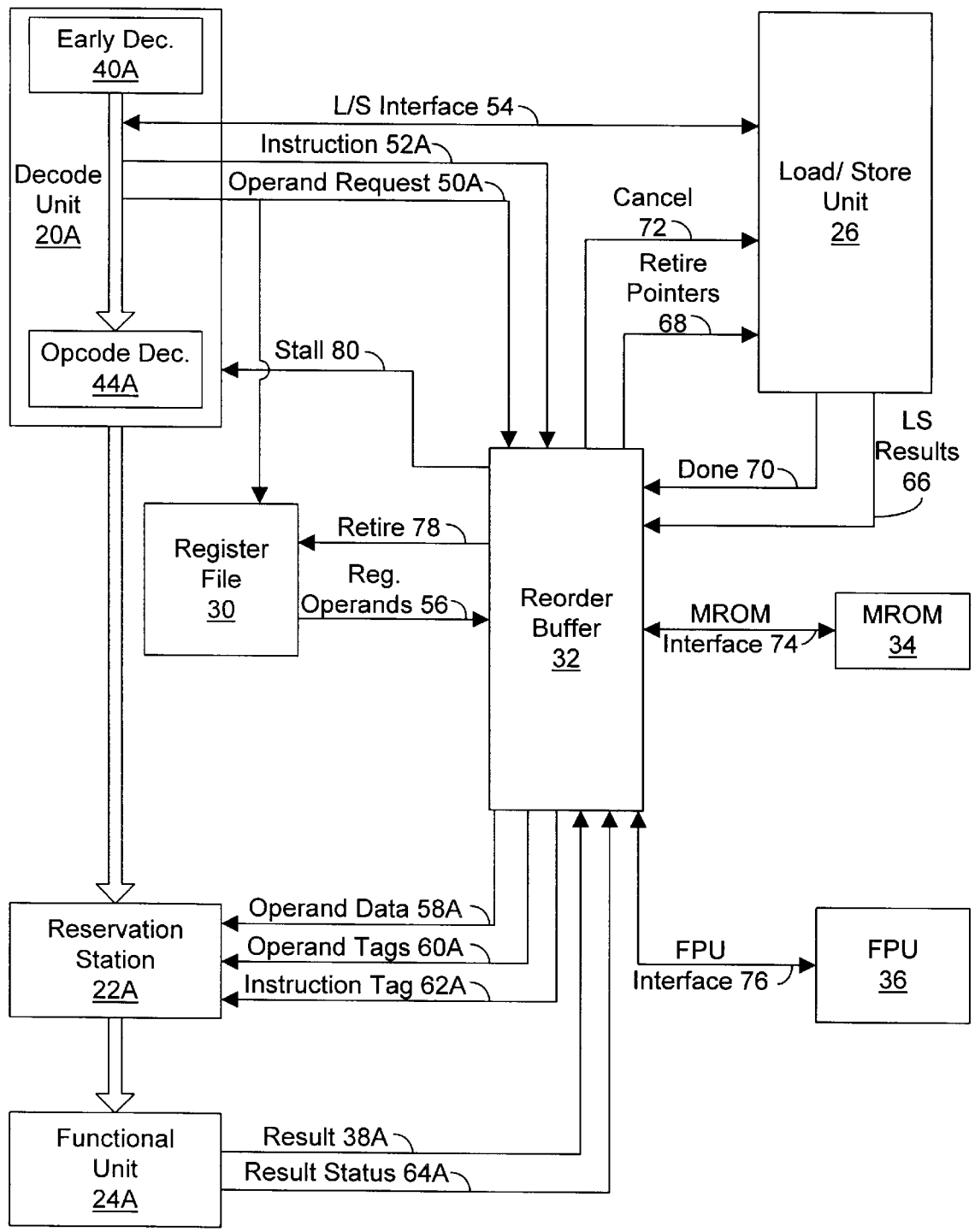
FIG. 3 is a diagram highlighting interconnection between a decode unit, a load/store unit, an MROM unit, a floating point unit, a functional unit, a reservation station, and a register file shown in FIG. 1, according to one embodiment of the microprocessor.

Turning next to FIG. 3, a block diagram of decode unit 20A, reservation station 22A, functional unit 24A, register file 30, reorder buffer 32, FPU 36, MROM 34, and load/store unit 26 is shown. Interconnection between the units is shown according to one embodiment of microprocessor 10. Other embodiments may employ other interconnection, and additional interconnection may be employed for other purposes. Interconnection between decode units 20B–20C, reservation stations 22B–22C, functional units 24B–24C and the remaining elements of FIG. 3 may be similar.

Decode unit 20A receives an instruction from instruction alignment unit 18. Early decode unit 40A detects the operands used by the instruction and conveys indications of the register operands to reorder buffer 32 and register file 30 upon an operands request bus 50A. Register pointers are conveyed, and the source and/or destination nature of the operand is identified. For the fast path instructions described above, up to two source operands may be identified, one of which is the destination operand as well. Still further, flag operands are identified upon operand request bus 50A. In one embodiment, the flag operands are divided into three groups: the carry flag, the status and direction flags, and the remaining flags. For embodiments employing the x86 microprocessor architecture, the status and direction flags are the D, O, S, Z, P, and A flags. Immediate data is conveyed to reorder buffer 32 upon immediate bus 51A. Reorder buffer 32 relays the immediate data upon operand data bus 58A. Most x86 instructions specify either a second register operand or immediate data, but not both. Therefore, the portion of operand data bus 58A used to convey the second register operand value may be used to convey the immediate data. For branch instructions, the program counter address, an offset, and the predicted target address may be conveyed upon operand data bus 58A.

Decode unit 20A additionally conveys certain information regarding the instruction to reorder buffer 32 upon an instruction bus 52A. Exemplary instruction information employed in one embodiment of microprocessor 10 is described in more detail further below. Additionally, early decode unit 40A detects load/store memory operations specified by the instruction. An indication of the memory operations is conveyed to load/store unit 26 via load/store interface 54.

In response to the operands conveyed upon operands request bus 50A, register file 30 conveys register operand values upon register operands bus 56 to reorder buffer 32. The register values conveyed comprise the values stored in register file 30 (i.e. the values generated according to the instructions previously retired by reorder buffer 32). If reorder buffer 32 is not storing information regarding an instruction which uses the register as a destination operand, the value provided by register file 30 is conveyed to the reservation station 22A–22C which receives the instruction. For example, a register value corresponding to the instruction conveyed to reservation station 22A may be conveyed upon operand data bus 58A.

Alternatively, reorder buffer 32 may be storing information regarding an instruction which updates the requested register. If the instruction has executed and has provided an instruction result, that result is conveyed in lieu of the register value provided by register file 30 upon operand data bus 58A. If the instruction has not yet executed, the reorder buffer tag locating the instruction within reorder buffer 32 is conveyed upon an operand tags bus 60A. One operand data value and one operand tag are provided for each source operand of the instruction upon operand data bus 58A and operand tags bus 60A, respectively. Additionally, validity indicators are asserted for each data and tag value by reorder buffer 32, such that reservation station 22A may discern which is being provided for a particular operand (e.g. data or reorder buffer tag).

In addition to providing operand values and tags, reorder buffer 32 provides an instruction tag for the instruction being dispatched to reservation station 22A upon an instruction tag bus 62A. The instruction tag identifies the storage location within reorder buffer 32 which stores information regarding the instruction. The instruction tag is conveyed upon result bus 38A (one of result buses 38 shown in FIG. 1) when the instruction is executed, such that the corresponding instruction result may be stored within reorder buffer 32. In one embodiment, instruction tag bus 62A conveys a line tag identifying the line of storage which stores the instruction information. The offset tag is a constant which is inherent in the issue position to which the instruction is conveyed. In other words, functional unit 24A provides results which are always stored at a particular offset within the lines of storage within reorder buffer 32.

In addition to storing the operand values and tags corresponding to an instruction, reservation station 22A receives the decoded instruction provided by opcode decode unit 44A. When each of the source operand values corresponding to the instruction have been provided by reorder buffer 32 or have been captured from result buses 38, the instruction may be selected for execution by functional unit 24A. Upon selecting the instruction for execution, reservation station 22A conveys the decoded instruction and corresponding operands to functional unit 24A.

Functional unit 24A executes instructions received from reservation station 22A and conveys the instruction tag corresponding to the instruction upon result bus 38A in addition to the instruction result generated therein. In one embodiment, the instruction tag is forwarded as the instruction begins execution but reorder buffer 32 does not receive the corresponding instruction result until the clock cycle following instruction execution. The instruction tag may be forwarded in this manner because it is unchanged during instruction execution, whereas the instruction result must be generated by functional unit 24A and then forwarded. It is noted that result bus 38A is coupled to reservation stations 22 (such as reservation station 22A shown in FIG. 3) for providing forwarded results thereto. Still further, result bus 38A is coupled to load/store unit 26. Functional unit 24A provides the logical address of a memory operation specified by the instruction being executed therein to load/store unit 26 via result bus 38A.

Functional unit 24A additionally forwards a result status upon a result status bus 64A to reorder buffer 32. The result status indicates any exceptions associated with the instruction, such that reorder buffer 32 may take appropriate corrective actions. Corrective actions may include hardware supported correction, trapping to a microcode routine within MROM unit 34, or trapping to a software routine stored at a particular address identified for the instruction. Result status bus 64A may additionally be used to indicate execution of a branch instruction which is mispredicted.

Reorder buffer 32 interfaces to load/store unit 26 to allow completion of load/store memory operations. Load/store unit 26 may be configured to speculatively execute load and store memory operations which hit in data cache 28. Load memory operation results (along with a reorder buffer tag including both line tag and offset tag portions) are conveyed upon an LS results bus 66 to reorder buffer 32. Additionally, the load results are forwarded to reservation stations 22 in order to provide operands thereto. In one embodiment, up to two results may be provided upon LS results bus 66.

Load/store unit 26 may be configured not to speculatively perform memory operations which miss data cache 28. Reorder buffer 32 indicates upon retire pointers bus 68 which memory operations are otherwise in position to be retired but have not yet executed. Load/store unit 26 then performs the indicated memory operations and returns results upon LS results bus 66. Additionally, load/store unit 26 asserts a corresponding signal upon a done bus 70. Reorder buffer 32 recognizes the asserted done signal as a completion of the memory operation indicated upon retire pointers bus 68. Since load/store unit 26 may execute up to two memory operations concurrently according to one embodiment, retire pointers bus 68 may carry up to two reorder buffer tags. Accordingly, done bus 70 includes two done signals corresponding to each of the reorder buffer tags.

A cancel bus 72 is included between reorder buffer 32 and load/store unit 26 as well. Cancel bus 72 includes a signal for each reorder buffer tag conveyed upon retire pointers bus 68. If the corresponding cancel signal is asserted, then reorder buffer 32 is indicating that the corresponding memory operation should be deleted from load/store unit 26. Memory operations are deleted when they are subsequent to a mispredicted branch or an instruction which experienced an exception, for example.

Reorder buffer 32 interfaces with MROM unit 34 and FPU 36 via MROM interface 74 and FPU interface 76, respectively. MROM interface 74 is used (among other things) to implement branch misprediction recovery for branch instructions which originate in MROM unit 34 as opposed to the original instruction stream. If a mispredicted branch is encountered and the branch instruction originated within MROM unit 34, reorder buffer 32 informs MROM unit 34 via MROM interface 74. MROM interface 74 performs branch misprediction recovery for such mispredicted branch instructions.

Since FPU 36 operates as a coprocessor, several signals are used to synchronize completion of an instruction within FPU 36. These signals are included within FPU interface 76. Generally, a signal may be asserted to FPU 36 indicating that a particular floating point instruction may be retired. When the floating point instruction is retired, FPU 36 asserts a second signal. Additionally, upon detection of a floating point synchronization instruction, another set of signals are asserted to synchronize the completion of the instruction.

Instructions are retired from reorder buffer 32 in program order. Upon retirement, the corresponding register results are conveyed upon a retire bus 78 to register file 30. As noted above, the instructions within a line of storage are retired simultaneously. Since more than one instruction within the instructions may update the same register, reorder buffer 32 employs a set of bits within each line referred to as the last in line (LIL) bits. The LIL bits are set for each instruction which is the last instruction within the line to update a particular register. One bit is included for each portion of the register (i.e. EAX, AH, and AL, wherein AX is represented by both AH and AL being set). Effectively, these bits act as byte enables for updating the register. Therefore, an instruction which updates AH and another instruction which updates AL may retire simultaneously. For embodiments employing a microprocessor architecture which does not allow updates to only a portion of a register, one LIL bit is included for each instruction.

Finally, reorder buffer 32 employs a stall line 80 for stalling instruction dispatch. Instruction dispatch may be stalled for many reasons, including: reorder buffer, reservation station, or load/store buffer full conditions; a narrow to wide stall; instruction serialization; etc. Upon detection of a stall condition, reorder buffer 32 asserts a stall signal upon stall line 80. If decode unit 20A receives an asserted stall signal during a clock cycle and decode unit 20A is attempting to dispatch an instruction, decode unit 20A provides that same instruction during a subsequent clock cycle. In this manner, an instruction which cannot be dispatched during a particular clock cycle is continuously redispatched until the stalling condition terminates.

Figure 4:
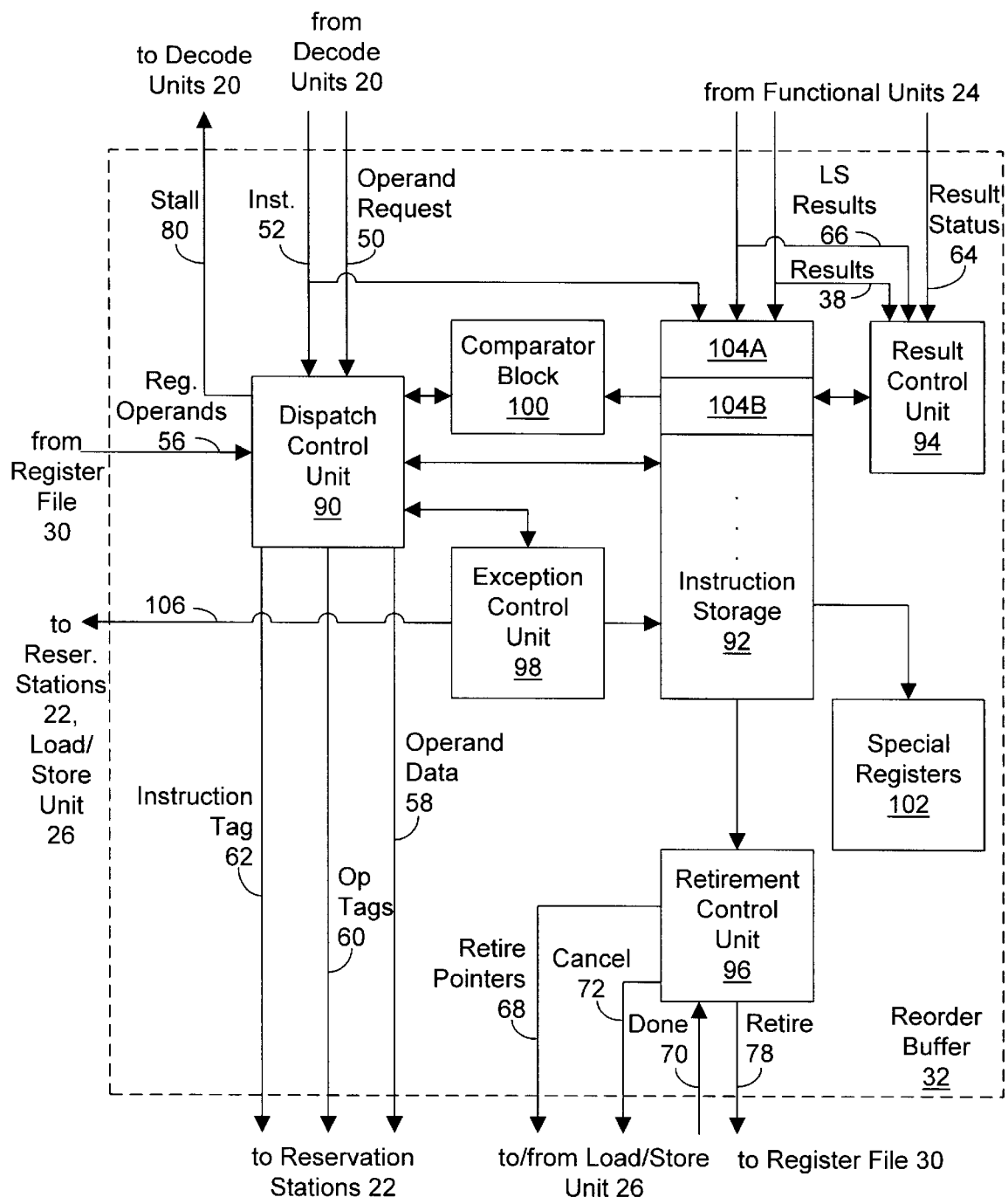
FIG. 4 is a block diagram of one embodiment of the reorder buffer shown in FIG. 1.

Turning now to FIG. 4, a block diagram of one particular embodiment of reorder buffer 32 is shown. Other particular embodiments are contemplated as well. As shown in FIG. 4, reorder buffer 32 includes a dispatch control unit 90, an instruction storage 92, a result control unit 94, a retirement control unit 96, an exception control unit 98, a comparator block 100, and a special registers block 102. Buses which are suffixed in FIG. 3 with an "A" are shown in FIG. 4 without the "A" to represent the bus from decode unit 20A as well as similar buses from decode units 20B–20C. For example, operand request bus 50 includes operand request bus 50A as well as an operand request bus 50B from decode unit 20B and an operand request bus 50C from decode unit 20C.

Dispatch control unit 90 is coupled to exception control unit 98, instruction storage 92, and comparator block 100. Comparator block 100 is further coupled to instruction storage 92, as is exception control unit 98. Result control unit 94, retirement control unit 96, and special registers block 102 are coupled to instruction storage 92 as well.

Dispatch control unit 90 receives instruction information and corresponding operand identifiers upon instruction buses 52 and operand request buses 50, respectively. Furthermore, corresponding immediate data (if any) is received upon immediate buses 51. Upon receipt of at least one valid instruction from decode units 20, dispatch control unit 90 allocates a line of storage within instruction storage 92. Instruction storage 92 includes multiple lines of storage, such as lines 104A and 104B shown in FIG. 4. The instruction information received upon instruction bus 52 is stored into the line of storage, as well as an indication of the destination operand of the instruction. Dispatch control unit 90 provides the line tag identifying the allocated line of storage upon instruction tag bus 62 to reservation stations 22. Reservation stations 22 may thereby identify the line of storage 104 which stores the instruction, and the offset tag is inherent in the issue position of the receiving reservation station 22A–22C.

Dispatch control unit 90 further provides dependency checking for each source operand. Comparator block 100 is provided for performing dependency checking. A comparator within comparator block 100 is assigned to each destination operand which may be stored within instruction storage 92 and to each source operand which may be requested upon operand request buses 50. The comparator compares the destination operand to the source operand to detect any dependencies with instructions outstanding within reorder buffer 32. Because x86 instructions allow a portion of a register to be updated and accessed, the comparators compare not only the register identifiers but the respective sizes of the updates. If a dependency is detected, the corresponding reorder buffer tag (i.e. both line tag and offset tag) is forwarded upon operand tags bus 60. Additionally, if an instruction result has been provided for the instruction upon which the dependency is detected, the result is provided upon operand data bus 58. If no dependency is detected, the register file value provided upon register operands bus 56 is provided upon operand data bus 58.

In one embodiment, instruction storage 92 stores a last-in-buffer indication for each instruction. The last-in-buffer indication indicates whether or not the instruction is the last (in program order) within the buffer to update the destination operand of that instruction. Comparators within comparator block 100 include the last-in-buffer indication in their comparisons, such that only the last instruction is detected as a dependency. Since only the correct dependency is identified by comparator block 100 (as opposed to all instructions within the buffer which update the same destination), logic which determines the correct dependency from the comparator outputs may be simplified. Additionally, since one of the source operands is also the destination, resetting the last-in-buffer indication when a new instruction is dispatched requires little extra logic. When the comparator corresponding to a particular instruction within instruction storage 92 asserts its output signal and the source operand being compared is also the destination of the instruction being dispatched, the last-in-buffer indication of that particular instruction is reset. The last-in-buffer indication is set for each instruction dispatched.

For embodiments employing the x86 instruction set, three types of dependencies may exist: an equal-sized dependency, a narrow-to-wide dependency, and a wide-to-narrow dependency. An equal-sized dependency exists if both the source operand and the destination operand being compared update the same portion of the same register. A narrow-to-wide dependency exists if the source operand accesses a larger portion of the register than the destination operand updates. Conversely, a wide-to-narrow dependency exists if the source operand accessed a smaller portion of the register than the destination operand updates. Equal-sized dependencies and wide-to-narrow dependencies may be handled by forwarding the destination operand's reorder buffer tag or result value. Narrow-to-wide dependencies are somewhat more problematic, since the instruction corresponding to the destination operand does not provide the entire value used by the source operand. Dispatch control unit 90 may stall the instruction corresponding to the narrow-to-wide dependency for such embodiments via assertion of a stall signal upon stall line 80. The stall signal may remain asserted until the destination operand is retired or discarded from instruction storage 92.

Instruction results are provided by functional units 24 upon result buses 38, while load/store unit 26 provides load memory operation results upon LS results bus 66. Result control unit 94 examines the reorder buffer tags provided by functional units 24 and load/store unit 26 to determine which lines of storage and which instructions within the lines receive the results. As noted above, functional units 24 provide a line tag only. The offset tag is a constant for each functional unit. However, load/store unit 26 is not associated with a fixed, symmetrical issue position in the manner of functional units 24. Therefore, load/store unit 26 provides both the line tag and the offset tag for each result. Result control unit 94 directs instruction storage 92 to store each result in the appropriate line and offset.

Additionally, result control unit 94 receives an exception status for each instruction upon result status bus 64. If a functional unit 24 or load/store unit 26 reports an exception while executing an instruction, result control unit 94 stores the exception status into instruction storage 92 at the line and offset storing the corresponding instruction. Result control unit 94 may also signal exception control unit 98 directly regarding certain exceptions (e.g. branch misprediction), such that recovery may begin. Alternatively, exception control unit 98 may detect other exceptions as the corresponding instructions are retired from instruction storage 92.

Retirement control unit 96 is configured to retire instructions from instruction storage 92. Generally, the instructions within a line of storage 104 are retired simultaneously. Additionally, instructions are retired in program order. Therefore, retirement control unit 96 monitors the line of storage 104 storing the instruction which is foremost in program order among the instructions within instruction storage 92 (the "oldest line"). When each of the instructions within the oldest line have executed and provided results, the instructions are retired. Instruction results which update register file 30 are conveyed upon retire bus 98 along with the corresponding last-in-line bits. The line of storage is then deallocated, freeing storage space for a set of concurrently dispatched instructions.

Retirement control unit 96 further scans the instructions within instruction storage 92 to detect load/store memory operations which have not yet completed and which are no longer speculative. A load/store memory operation is no longer speculative if the instructions prior to the instruction corresponding to the load/store memory operation have completed without exception. Retirement control unit 96 conveys the reorder buffer tag of the instruction corresponding to the non-speculative load/store memory operation upon retire pointers bus 68 to load/store unit 26. Load/store unit 26 may subsequently select the memory operation for access to data cache 28. Upon completion of the memory operation, load/store unit 26 asserts a done signal upon done bus 70. Retirement control unit 96 may then mark the corresponding memory operation as completed within instruction storage 92. If the remaining instruction operations associated with the instruction corresponding to the completed memory operation have also been performed, the instruction is ready for retirement.

Retirement control unit 96 may further operate signals upon cancel bus 72 in conjunction with retire pointers bus 68. If an instruction corresponding to a load/store memory operation has been cancelled (due to exception conditions), the cancel signal is asserted when the reorder buffer tag of the instruction is conveyed upon retire pointers bus 68. Load/store unit 26 discards the identified memory operation and asserts the corresponding done signal. Alternatively, exception control unit 98 may operate the cancel signals.

Upon retirement of instructions which update special registers within special registers block 102, the special registers are updated. In one embodiment, the special registers within special registers block 102 include: the program counter register, which stores an address indicative of the last instruction to be retired; an MROM program counter register, which stores a ROM address indicative of the last retired instruction from MROM unit 34; a floating point program counter register, which stores an address indicative of the last floating point instruction to be retired; recovery registers for the program counter and ESP for use with branch and CALL/RETURN instructions whose targets experience a segment limit violation; the flags registers; a floating point opcode register storing the opcode of the last floating point instruction to be retired; and a debug register.

Exception control unit 98 handles recovery from exceptions experienced by microprocessor 10. An exceptions control bus 106 is provided by exception control unit 98 to indicate exceptions and corrective actions to reservation stations 22 and load/store unit 26. Any suitable set of corrective actions may be performed.

In one embodiment, branch misprediction exception recovery begins upon detection of the branch misprediction, while exception recovery for other exceptions begins upon retirement of the corresponding instruction. Branch misprediction recovery may be performed in many ways. For example, exception control unit 98 may provide the reorder buffer tag of the branch instruction upon exceptions control bus 106. Instructions subsequent to the branch instruction are discarded by comparing the corresponding reorder buffer tags to the branch instruction tag. For this method, reservation stations 22 and load/store unit 26 must be able to determine program order from the values of the reorder buffer tags. As another example, exception control unit 98 may assert a branch misprediction signal upon exceptions control bus 106. Reservation stations 22 and load/store unit 26 may note the instructions which are stored therein upon receipt of the asserted signal. Subsequently, exception control unit 98 may indicate that the mispredicted branch instruction is retired. Instructions remaining within reservation stations 22 and load/store unit 26 upon receipt of the retirement indication may then be discarded if the instructions are noted as stored therein upon detection of the mispredicted branch. Other instructions which arrived subsequent to detection of the mispredicted branch are from the corrected path and therefore are retained. In yet another example, load/store memory operations subsequent to the mispredicted branch in program order may be cancelled via cancel bus 72. Random data may be forwarded for the cancelled load memory operations, and other instructions which are subsequent to the mispredicted branch may be allowed to execute and forward results. The instructions are then discarded by reorder buffer 32.

In addition to causing instruction discard in other portions of microprocessor 10, exception control unit 98 directs dispatch control unit 98 to "redispatch" the instructions within instruction storage 92 which are prior to the mispredicted branch in program order. Since instructions subsequent to the mispredicted branch instruction may be indicated to be last-in-buffer updates to one or more registers, this "redispatch" allows the dependency checking logic of dispatch control unit 90 to recover the state of the last-in-buffer indications for the instructions prior to the mispredicted branch. The "redispatch" is performed internal to reorder buffer 32 (i.e. other portions of microprocessor 10 are unaffected). In one embodiment, dispatch control unit 90B begins with the oldest line of instructions and redispatches each line of instructions up to and including the line of instructions including the mispredicted branch instruction (save the instructions within the line which are subsequent to the mispredicted branch instruction).

In another embodiment, redispatch begins with the line of instructions including the mispredicted branch instruction and proceeds in inverse program order. If an update to a register is detected, the LIB bits are set appropriately. Additionally, dispatch control unit 90 notes that the LIB bits for that register have been set during the recovery. Updates to that register (or portion thereof) are ignored in subsequent redispatches since the redispatch is proceeding in inverse program order. This embodiment has the advantage that lines of instructions prior to the mispredicted branch which are retired prior to the completion of mispredicted branch recovery are not redispatched. Branch misprediction recovery may thereby complete in fewer clock cycles than other branch misprediction recovery mechanisms.

Figure 5:
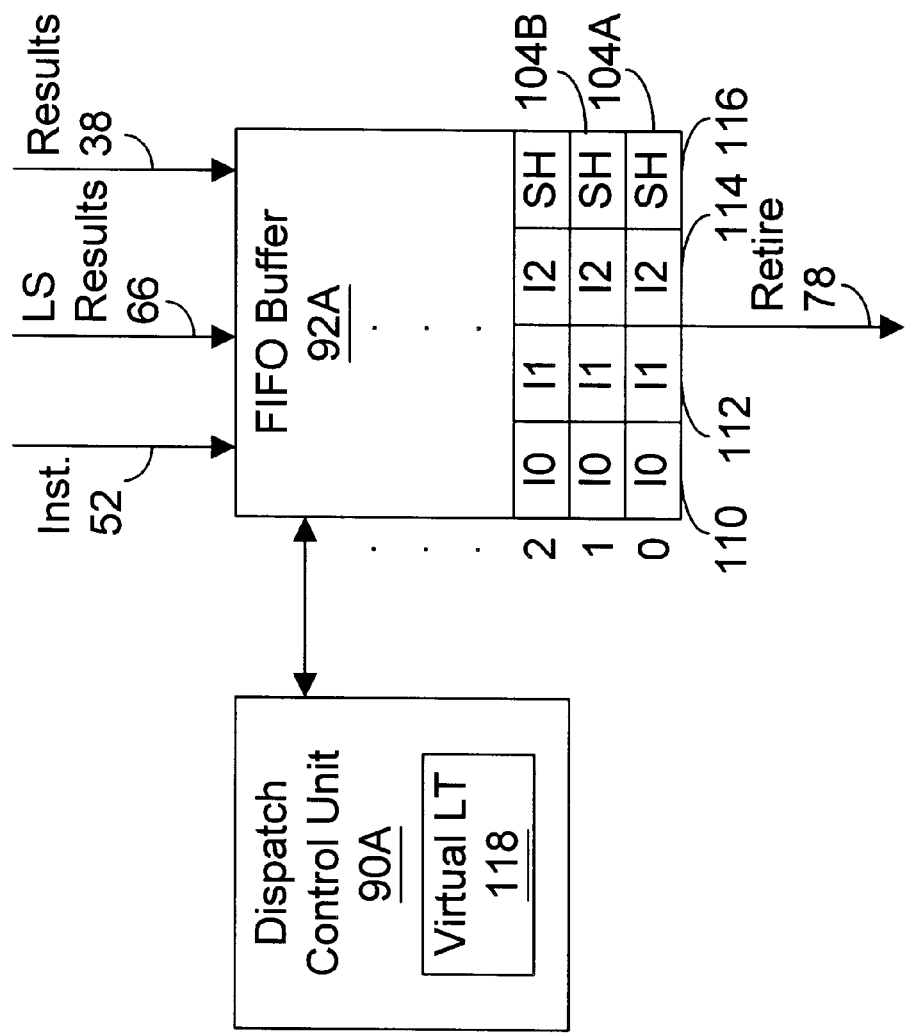
FIG. 5 is a block diagram of a dispatch control unit and a FIFO buffer according to one embodiment of the reorder buffer shown in FIG. 4.

Turning now to FIG. 5, a block diagram depicting one implementation of instruction storage 92 is shown. The implementation shown in FIG. 5 is a first-in, first-out (FIFO) buffer 92A. Additionally, an embodiment of dispatch control unit 90 (dispatch control unit 90A) is shown.

A FIFO buffer generally comprises multiple storage locations which operate as a queue. As the name implies, the first item placed in a FIFO buffer is the first item to be removed from the buffer. The "items" for FIFO buffer 92A comprise lines of instructions. For example, the embodiment of FIFO buffer 92A illustrated in FIG. 5 stores up to three instructions per line. Therefore, each line of storage includes a first instruction (I0) field 110, a second instruction (I1) field 112, and a third instruction (I2) field 114. Additionally, certain information which is shared by the instructions in the line is stored in a shared (SH) field 116. A line of storage 104 is allocated to one or more concurrently dispatched instructions by dispatch control unit 90A. Although the line of storage 104 shown in this implementation includes up to three instructions, other embodiments of FIFO buffers or instruction storages may include any number of instructions greater than one.

FIFO buffer 92A shifts the lines of instructions stored therein such that the oldest line of instructions is in the bottom storage location of FIFO buffer 92A (e.g. the location labeled zero in FIG. 5). The "bottom" of a FIFO buffer is the storage location which is defined to store the item which is next to be removed from the FIFO buffer. When the item at the bottom is removed, the remaining items are shifted within the FIFO buffer such that the item which was second to the bottom of the FIFO buffer becomes the item stored at the bottom. For FIFO buffer 92A, each time a line of instructions is retired, FIFO buffer 92A is shifted such that the line of instructions which was next to the bottom of FIFO buffer 92A becomes the line of instructions stored at the bottom. In this manner, the storage location which is defined to be the bottom of FIFO buffer 92A is the only storage location accessed by retirement control unit 76 in order to retire instructions.

Dispatch control unit 90A allocates a storage location within FIFO buffer 92A for each set of concurrently dispatched instructions received by reorder buffer 32. When FIFO buffer 92A is empty, dispatch control unit 90A allocates location zero. If location zero is occupied and location one is empty, location one is allocated. Similarly, other locations within FIFO buffer 92A are allocated if all the locations between that location and the bottom of FIFO buffer 92A are occupied with instructions. The location numbers shown in FIG. 5 next to FIFO buffer 92A are therefore physical line tags which identify one line of storage within FIFO buffer 92A from the other lines of storage within FIFO buffer 92A.

Because instruction information and results are shifted between lines of storage 104 within FIFO buffer 92A, physical line tags are unsuitable for use in identifying a particular instruction. The physical line tag changes as instructions are retired from FIFO buffer 92A. Therefore, dispatch control unit 90A assigns a virtual line tag to a set of concurrently dispatched instructions. The virtual line tag is stored in the shared field 116 of the line of storage allocated to the instructions. As the line of instructions is shifted between lines of storage 104 within FIFO buffer 92A, the virtual line tag is moved along as well. Therefore, result control unit 94 may search the virtual line tags stored within FIFO buffer 92A in order to locate the line of storage 104 storing an instruction for which a result is being provided.

Dispatch control unit 90A includes a storage location 118 which stores the virtual line tag to be allocated to the next set of concurrently dispatched instructions received by reorder buffer 32. When dispatch control unit 90A allocates a line of storage to the set of concurrently dispatched instructions, the virtual line tag stored in storage location 118 is incremented. If lines of instructions are discarded due to branch misprediction, the virtual line tag may be reset to the virtual line tag subsequent to the virtual line tag assigned to the mispredicted branch instruction. The virtual line tag is the tag conveyed to reservation stations 22, load/store unit 26, and any other portions of microprocessor 10 which receive reorder buffer tags.

Figure 6:
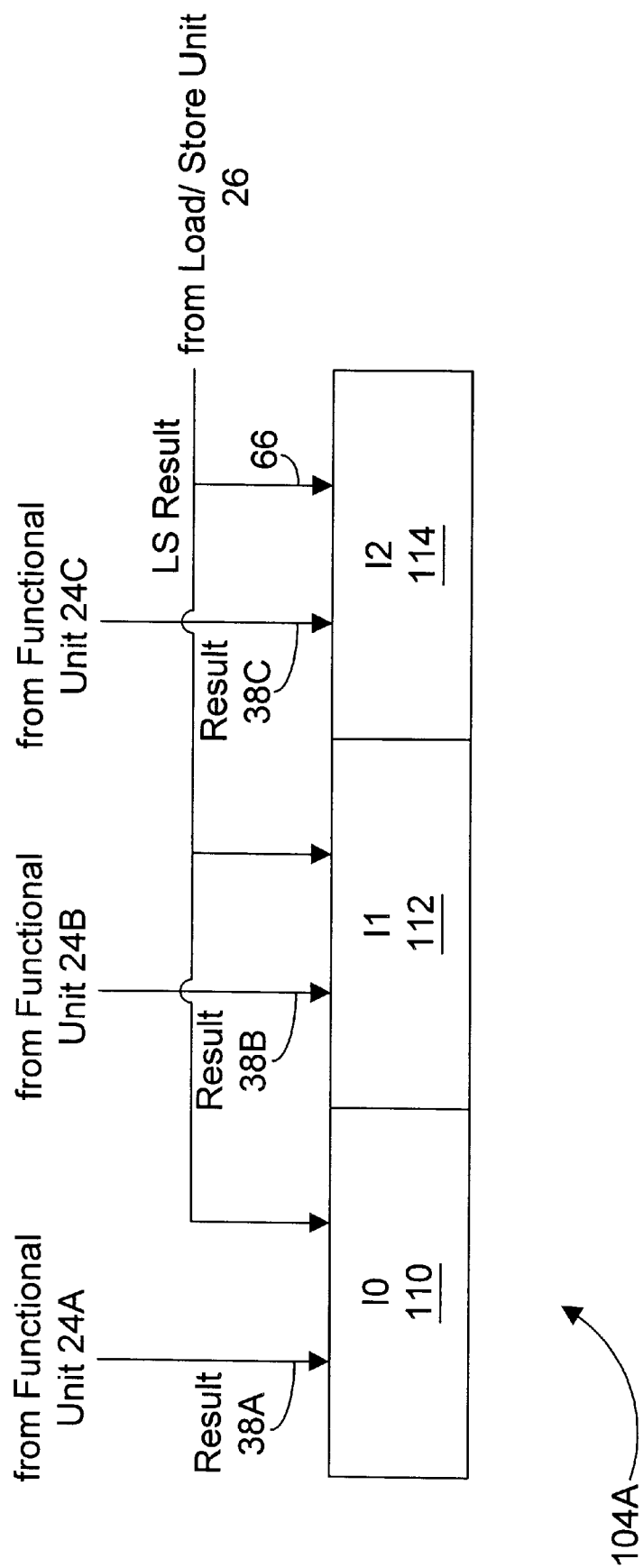
FIG. 6 is an illustration of the result buses connected to portions of a line of storage depicted in FIG. 5, according to one embodiment of a line of storage.

Turning next to FIG. 6, an illustration of the connection of results buses 38 and LS result buses 66 to an exemplary line of storage 104A is shown. Result bus 38A from functional unit 24A, result bus 38B from functional unit 24B, and result bus 38C from functional unit 24C are shown. Because microprocessor 10 employs fixed issue positions and because an instruction field 110–114 corresponds to a particular issue position, each result bus 38 connects to a particular instruction field 110–114 within each line of storage. In other words, results provided upon result bus 38A are stored into first instruction field 110; results provided upon result bus 38B are stored into second instruction field 112; and results provided upon result bus 38C are stored into third instruction field 114.

FIG. 6 illustrates that functional units 24 need only provide a line tag to reorder buffer 32 upon result buses 38. The offset within the line (i.e. the particular instruction within the line of instructions), is inherent in the bus upon which the result arrives. Result control unit 96 uses the line tag to identify the line of storage to be updated, and the instruction field within the line is automatically located as the only instruction field to which the particular result bus 38A–38C may provide a value.

It is noted that, by configuring microprocessor 10 with multiple fixed, symmetrical issue positions, microprocessor 10 may be more likely to dispatch larger numbers of instructions concurrently than microprocessors having asymmetrical issue positions and line-oriented reorder buffers. Since the symmetrical issue positions execute the same subset of instructions, any random group of instructions within the subset may be dispatched to and executed concurrently by the symmetrical issue positions. Conversely, asymmetrical issue positions are limited to certain groups of instructions within the subset of instructions executed by the asymmetrical issue positions as a whole. For example, if several instructions are eligible for concurrent dispatch, but only one of the asymmetrical issue positions is configured to execute the several instructions, then typically only one of the several instructions may be dispatched at a time. Even if the issue position is configured to receive multiple dispatched instructions concurrently, the issue position may only execute the instructions one at a time. Therefore, the fixed, symmetrical issue positions configured into microprocessor 10 operate in conjunction with the lines of storage within reorder buffer 32 to provide high instruction dispatch and execution rates.

Load/store unit 26, on the other hand, does not correspond to a particular fixed issue position. Load/store unit 26 therefore provides both a line tag and an offset tag upon LS result buses 66. LS result buses 66 are coupled to each field of the lines of storage, thereby allowing results provided by load/store unit 26 to update any instruction field. The particular instruction field updated by a particular result is identified by the offset tag conveyed therewith.

Figure 7:
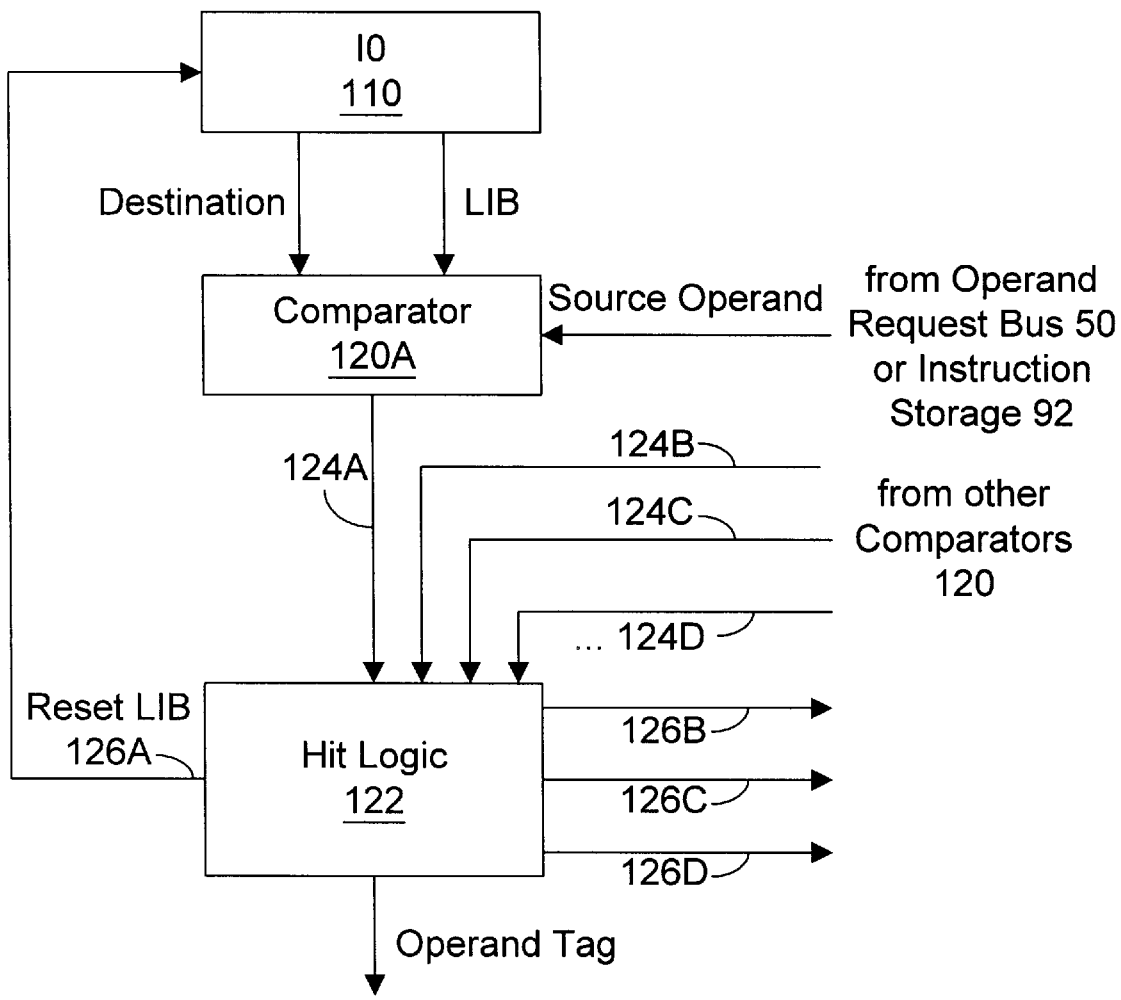
FIG. 7 is a block diagram of a portion of the dependency checking logic employed by one embodiment of the reorder buffer shown in FIG. 4.

Turning to FIG. 7, a block diagram of a portion of the dependency checking logic employed by one embodiment of reorder buffer 32 is shown. First instruction field 110 from line of storage 104A is shown, as well as a comparator 120A and a hit logic block 122. Comparator 120A receives the destination operand identifier from instruction field 110, as well as the last-in-buffer (LIB) indication. Additionally, comparator 120A receives a source operand identifier from operand request bus 50 (or from instruction storage 92, if branch misprediction recovery is being performed). Comparator 120A includes an output line 124A connected to hit logic block 122. Output line 124A is asserted if the destination operand identifier and the source operand identifier compare equal and the LIB indication is set. If the operand identifiers do not compare equal or the LIB indication is not set, output line 124A is deasserted.

Hit logic block 122 receives output line 124A as well as other output lines 124 (such as output lines 124B, 124C, and 124D shown in FIG. 7, among others). The output lines 124 received by hit logic block 122 emanate from comparators 120 which receive the same source operand identifier from operand request bus 50. Since the LIB indicator is included in comparators 120, only zero or one of output lines 124 is asserted for a particular dependency check. Hit logic 122 may therefore select the reorder buffer tag corresponding to the one asserted output line 124 for conveyance as the operand tag. No prioritization logic need be included within hit logic 122. For example, hit logic 122 may effectively comprise a multiplexor having reorder buffer tags as inputs and output lines 124 as selection controls.

Hit logic block 122 may additionally be configured to reset the LIB indication for an instruction if the source operand for which hit logic block 122 provides dependency information is also the destination operand. For example, if hit line 124A is asserted and comparator 120A receives a source/destination operand, hit logic 122 asserts a reset LIB line 126A to instruction field 110. Additional reset LIB lines 126 may be conveyed to other instruction fields corresponding to other comparators 120. It is noted that comparator output signals 124 may comprise reset LIB lines 126, since only the instruction for which the LIB indication is set is indicated as comparing equal.

It is further noted that, for embodiments employing the x86 microprocessor architecture, operand size information must be taken into account as well. The type of dependency (e.g. equal-sized, wide-to-narrow, or narrow-to-wide) is determined as well for such embodiments, as described above.

Figure 8:
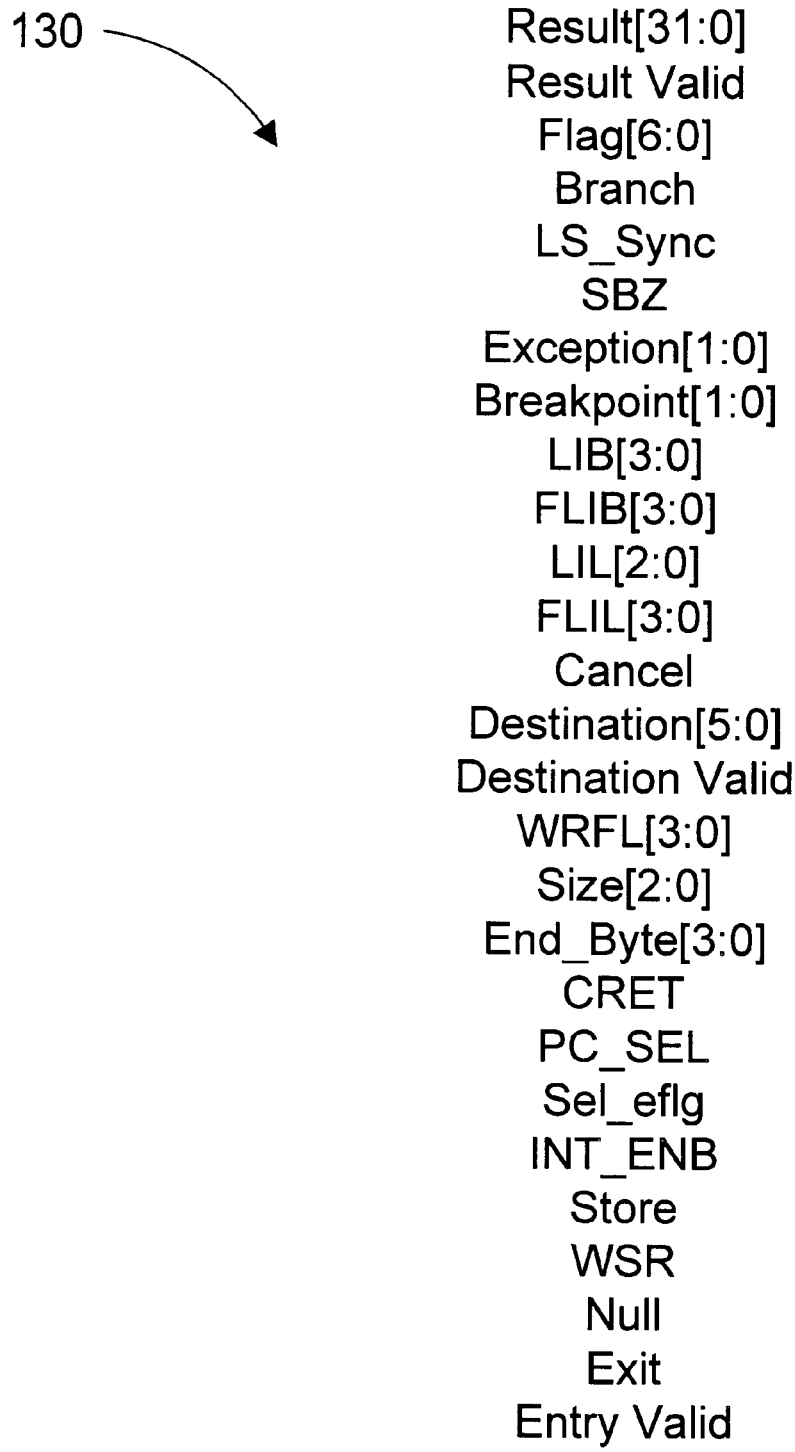
FIG. 8 is a table of information stored for each instruction within a line of storage according to one embodiment of the reorder buffer shown in FIG. 4.

Turning now to FIG. 8, a list 130 of exemplary information stored in an instruction field 110–114 according to one specific implementation of reorder buffer 32 is shown. Additional, substitute, or alternative information may be stored by other embodiments. Information having a bit encoding suffixed thereto is multi-bit information. Otherwise, a single bit is used.

The instruction result is stored in the instruction field, and a result valid bit indicates whether or not the instruction result has been provided. Similarly, any flag bits which are updated are stored in the instruction field. The branch indication is set if the instruction is a branch. The LS_Sync bit is set if a load/store resync is needed. A load instruction may need resynchronization (i.e. refetch and reexecution of the instruction and subsequent instructions in program order) if the load instruction is performed out of order and a snoop hit is detected on the address accessed by the load instruction prior to retirement of the load instruction. Store instructions which update instruction code which is outstanding within microprocessor 10 are also detected, causing a setting of the LS_Sync bit. Instructions following the store instruction for which the bit is set are refetched and reexecuted. The SBZ bit indicates, when set, that a shift by zero is performed for the corresponding instruction. Shift by zero is a defined exception for x86 instructions. Exception and breakpoint information corresponding to the instruction is stored as well.

As mentioned above, last-in-line (LIL) and last-in-buffer (LIB) information is stored for each instruction. LIL and LIB information corresponds to the destination register, while FLIL and FLIB correspond to the flags register. Four LIB bits are used, one bit corresponding to each portion of the destination register which may be selected by an instruction. The LIB bit to be used in the dependency comparison may be selected according to the size of the source operand being compared. In this manner, an update to the AH register, for example, does not interfere with an access to the AL register. Four FLIB bits are used as well, except that the four FLIB bits correspond to four groups of flag bits. A first group includes the S, Z, P, and A bits; a second group is the O bit; a third group is the D bit; and a fourth group is the C bit. Similar to the FLIB bits, the FLIL bits correspond to each of four groups of flags. The groups are chosen based upon the manner in which the x86 instruction set updates the flags.

The LIL bits are used as enables for updating register file 30. Therefore, one LIL bit indicates that the most significant two bytes of the destination register are updated by the instruction corresponding to this instruction field; a second LIL bit indicates that byte 1 (e.g. AH) is updated by the instruction; and a third LIL bit indicates that byte 0 (e.g. AL) is updated by the instruction.

The cancel bit, when set, indicates that the instruction has been cancelled. An instruction is cancelled if it is subsequent to a mispredicted branch. An instruction having the cancel bit set does not update register file 30.

The destination specifier is stored for each instruction, as well as a destination valid bit. The destination specifier may be invalid, for example, when the destination operand of the instruction is a memory location. WRFL[3:0] is used to indicate which flag groups are updated by the instruction. Similar to the LIL bits, Size[2:0] encodes the size of the destination operand. End_byte[3:0] stores the least significant four bits of the address at which the last byte of the instruction is stored. End_byte[3:0] may be used in conjunction with a program counter field described below to calculate an address for the program count register upon retirement of the instruction. The CRET bit is set if the instruction is a CALL or RETURN instruction. PC_Sel indicates which of two program counter values stored in shared field 116 corresponds to the instruction. If PC_Sel is clear, the first program counter value is selected. Otherwise, the second program counter value is selected. Similarly, the Sel_eflg field indicates which of two flags registers should be updated by this instruction. MROM instructions have a flags register dedicated for their use in addition to the architecturally defined flags register.

The INT_ENB bit, when set, indicates that the instruction may cause an interrupt. Instructions dispatched from MROM unit 34 cannot cause an interrupt, while fast path instructions may. The store bit is set if the instruction performs a store memory operation. Similarly, the WSR bit is set if the instruction updates a special register. The Null bit is set if the instruction field is not storing a valid instruction.

The Null bit may be set for instruction fields which did not receive an instruction upon allocation of the line of storage (i.e. less than the maximum number of concurrently dispatchable instructions was dispatched). Alternatively, an entry may be nullified if an exception is detected. The exit bit is set if the instruction is the last instruction of an MROM instruction sequence of if the instruction is a fast path instruction. Finally, the entry valid bit indicates that the instruction field is storing valid information. The entry valid bit is set if the Null bit is clear and the Cancel bit is clear.

FIG. 9 is a list 132 of exemplary information stored in shared field 116 according to one specific implementation of reorder buffer 32. Additional, substitute, or alternative information may be stored by other embodiments. Information having a bit encoding suffixed thereto is multi-bit information. Otherwise, a single bit is used.

The branch misprediction bit is set if a mispredicted branch is within the line of storage. Otherwise, the branch misprediction bit is clear. CSSEL stores the code segment selector for the line of instructions. The floating point bit is set if the line includes a floating point instruction, and the floating point instruction opcode is stored in FPOPC[10:0]. The FSYNC bit is set if a forced synchronization is performed for this line of storage. Forced synchronizations are performed upon execution of a taken branch instruction which was not detected by branch prediction unit 14. Branch prediction unit 14 is thereby updated with information identifying the taken branch instruction prior to retirement of the taken branch instruction.

The shared field stores up to two program count values per line. PC1 stores the program counter address for the first instruction stored within the line. PC2 stores the address of a split line instruction or the target of a branch instruction.

In this manner, instructions for up to two different cache lines may be stored within a single line of storage. In one particular embodiment, instructions from three different cache lines may be stored when the first instruction in the line is a split line instruction and the second instruction is a predicted taken branch instruction. The Last1 bit, Linetag1 [4:0], and LineOffset[3:0] correspond to PC1. Similarly, the Last2 bit, Linetag2[4:0], and LineOffset[3:0] correspond to PC2. The last bit is set if the last instruction in the cache line indicated by the corresponding PC value is within the line of storage. The line tag identifies branch prediction information corresponding to a branch instruction within the line. The branch prediction information may remain stored in branch prediction unit 14, and is updated by communicating the results of the branch instruction along with the line tag to branch prediction unit 14. Branch mispredictions are communicated upon detection of the mispredictions, while correct predictions are updated upon retirement of the corresponding branch instruction. The line offset contains a value which, when added to the corresponding PC value, locates the beginning of the next instruction after the instructions included within the line of storage.

The MROM bit is set if the line of storage contains one or more MROM instructions, and is clear otherwise. The NoMisp bit is set if the line cannot mispredict (i.e. no predicted branch instruction is in the line). The PCSHFT bit is set if the first instruction in the line of storage is a split line instruction (e.g. a portion of the instruction is in one instruction cache line the remainder is in another instruction cache line). If the first instruction is a split line instruction, PC1 corresponds to the cache line storing the remaining portion. PC2 may therefore be used for the target of a branch instruction. Finally, VLTAG[3:0] stores the virtual line tag assigned to the line of storage. VLTAGP1[3:0] stores the virtual line tag plus 1 (for use in resetting storage location 118 shown in FIG. 5 upon detection of a mispredicted branch instruction).

Figure 10:
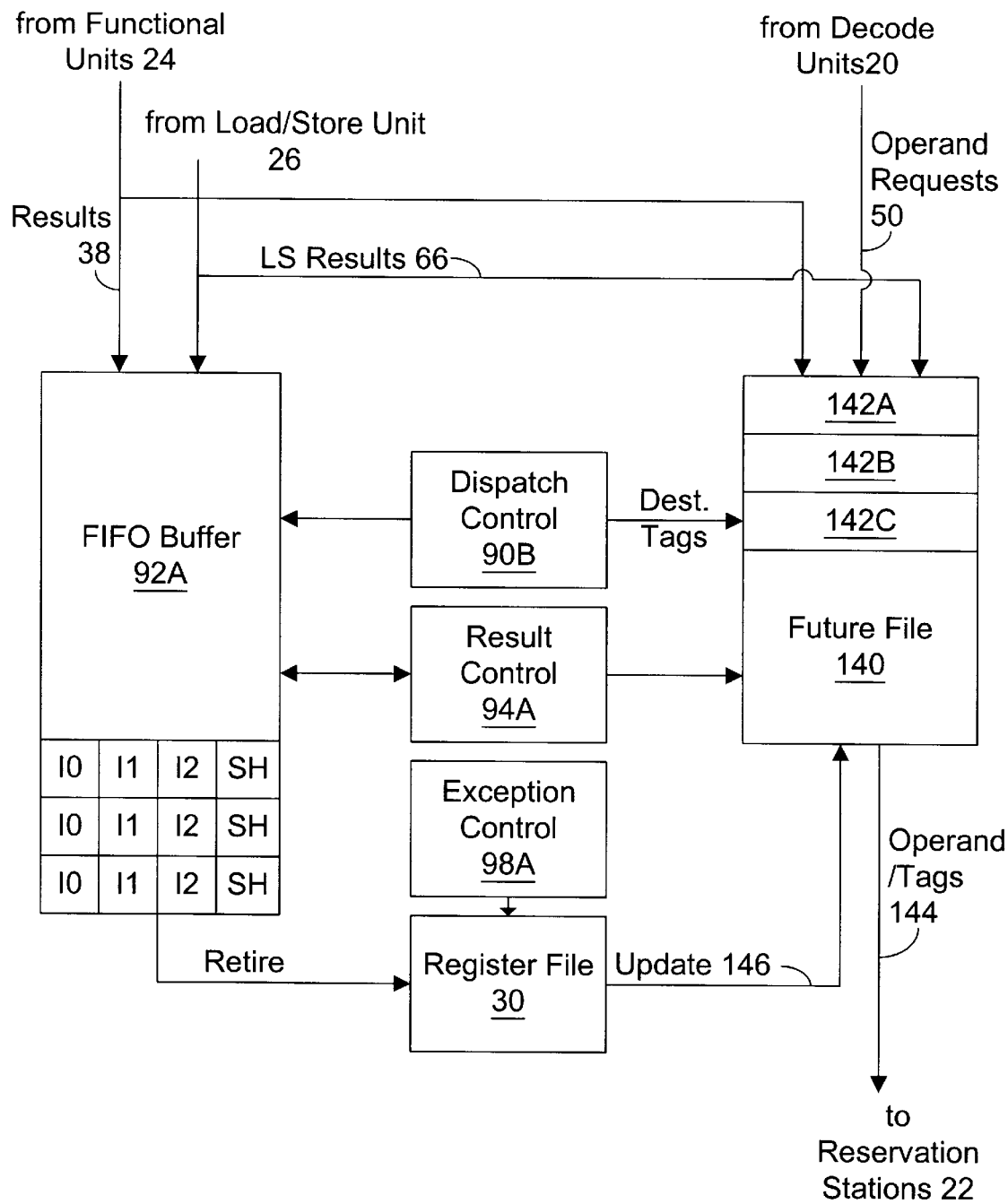
FIG. 10 is a block diagram of a second embodiment of the reorder buffer shown in FIG. 1, including a future file.

Turning now to FIG. 10, a block diagram of a portion of a second embodiment of reorder buffer 32 is shown. Additionally, register file 30 is shown in FIG. 10. For the embodiment shown in FIG. 10, reorder buffer 32 includes a future file 140. Additionally, FIFO buffer 92A, dispatch control unit 90B, results control unit 94A, and exception control unit 98A are included.

Future file 140 stores reorder buffer tags and/or instruction results for each register employed within register file 30. In other words, future file 140 includes a plurality of storage locations 142 such as storage locations 142A, 142B, and 142C. One storage location 142 is assigned to each register. The storage location 142 for a particular register stores the reorder buffer tag of the instruction which is last (in program order) within FIFO buffer 92A to update the register. An instruction having the register as a source operand receives the reorder buffer tag by accessing the corresponding storage location 142. When the corresponding instruction result is provided via execution of the instruction, the instruction result is stored into the storage location 142. Subsequently, the instruction result is provided instead of the reorder buffer tag. For this embodiment, therefore, a combined operands/tags bus 144 may be employed instead of separate operands and tags buses. Tag validity information may be used to indicate if a tag or data is conveyed for a given operand upon operands/tags bus 144.

Upon dispatch of an instruction, dispatch control unit 90B interacts with FIFO buffer 92A substantially as described above. Additionally, dispatch control unit 90B accesses the storage location 142 corresponding to each source operand. The corresponding reorder buffer tag or data is conveyed upon operands/tags bus 144. Additionally, for each instruction which has a register destination operand, the reorder buffer tag assigned to the instruction is stored into the storage location 142 assigned to that register. Advantageously, the large number of comparators used to compare source operands of dispatching instructions to destinations stored in FIFO buffer 92A are eliminated. Dispatch control unit 90B still performs dependency checking between concurrently dispatched instructions and forwards a reorder buffer tag upon operands/tags bus 144 if a dependency is detected therein, but the number of comparator circuits is relatively small. For example, three comparator circuits are employed when the maximum number of concurrently dispatched instructions is three. Six comparators are used when the maximum number of concurrently dispatched instructions is four, etc. Additionally, the number of entries in future file 140 is determined by the number of registers implemented by microprocessor 10. Therefore, FIFO buffer 92A may be increased in size arbitrarily without substantively increasing the size of the dependency checking logic (i.e. future file 140).

Result control unit 94A also interacts with FIFO buffer 92A substantially as described above upon receipt of results upon results buses 38 and/or LS result buses 66. In addition to updating the instruction result stored in FIFO buffer 92A, result control unit 94A examines the LIB bits for the instructions providing results. If the LIB bits are set, then result control unit 94A updates the corresponding entry in future file 140 as well. Result control unit 94A checks the status of the LIB bits in order to avoid overwriting a reorder buffer tag of an instruction subsequent to the instruction for which results are being provided when the subsequent instruction updates the same register as the instruction.

As noted above for one embodiment, the reorder buffer tag is provided upon results buses 38 and LS results buses 66 during the clock cycle prior to the instruction result itself. During the clock cycle that the reorder buffer tag is provided, result control unit 94A checks the LIB bits for the identified instruction. In this manner, result control unit 94A determines whether to update both future file 140 and FIFO buffer 92A or only FIFO buffer 92A prior to arrival of the corresponding data.

Future file 140 maintains dependency information corresponding to updates by the last instructions in the predicted program order speculatively fetched and dispatched by microprocessor 10. In the case of branch misprediction and exception, the values stored in future file 140 must be recovered so as not to reflect the instructions from the predicted instruction stream which are discarded. Exception control unit 98A communicates with register file 30 upon initiation of exception or branch misprediction recovery. Register file 30 transmits the contents of each register included therein upon an update bus 146 to future file 140. Future file 140 stores the transmitted results into the corresponding storage locations 142. For exceptions which are serviced when the instruction experiencing the exception is retired, the transmittal of register file values completes recovery of future file 140. However, additional steps are employed for branch misprediction recovery, which is initiated prior to retirement of the mispredicted branch instruction.

For mispredicted branch instructions, subsequent to copying the contents of register file 30 into future file 140, dispatch control unit 90B redispatches the instructions prior to the mispredicted branch instruction (as described above). Dispatch control unit 90B recovers the LIB bits of the lines of storage which store instructions prior to the mispredicted branch instruction in program order, as described above. In addition, the destination tags (or the instruction results, if already provided) of the instructions are stored into future file 140. In this manner, the state of future file 140 is recovered to the state consistent with execution of the mispredicted branch instruction and the prior instructions in program order.

Figure 11:
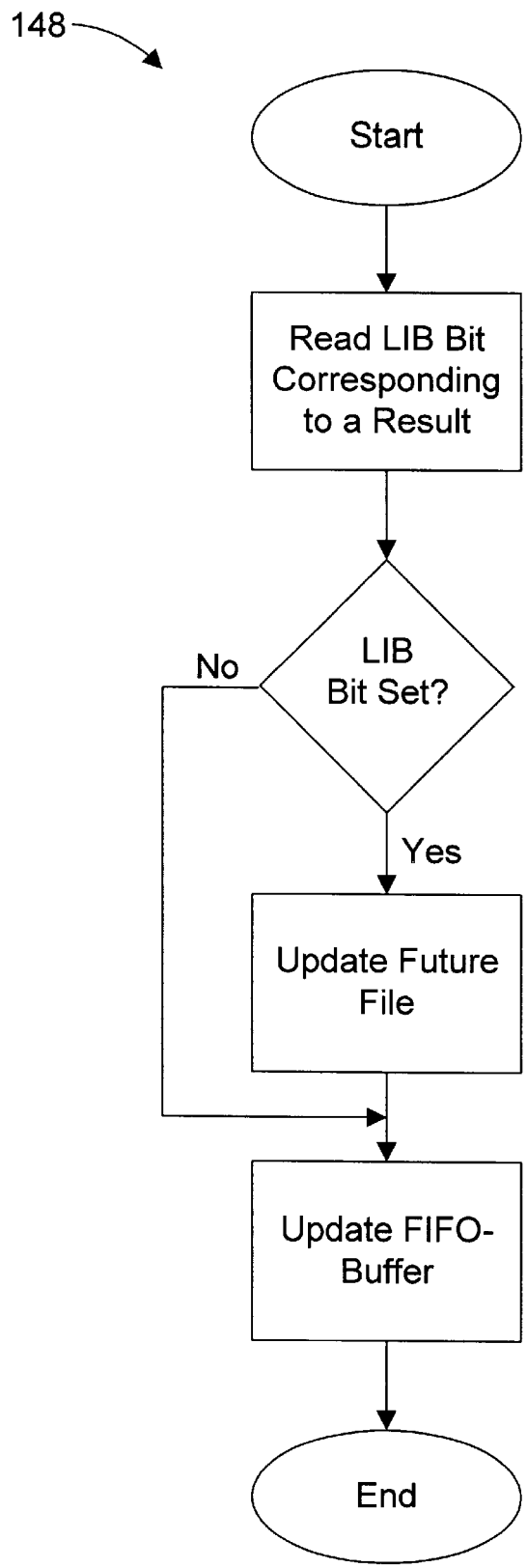
FIG. 11 is a flow chart illustrating update of the future file and the reorder buffer instruction storage shown in FIG. 10, according to one embodiment of the reorder buffer.

FIG. 11 is a flowchart 148 depicting receipt of a result by result control unit 94A. Update of FIFO buffer 92A is illustrated, as well as the conditional update of future file 140 depending upon the state of the LIB bits.

Figure 12:
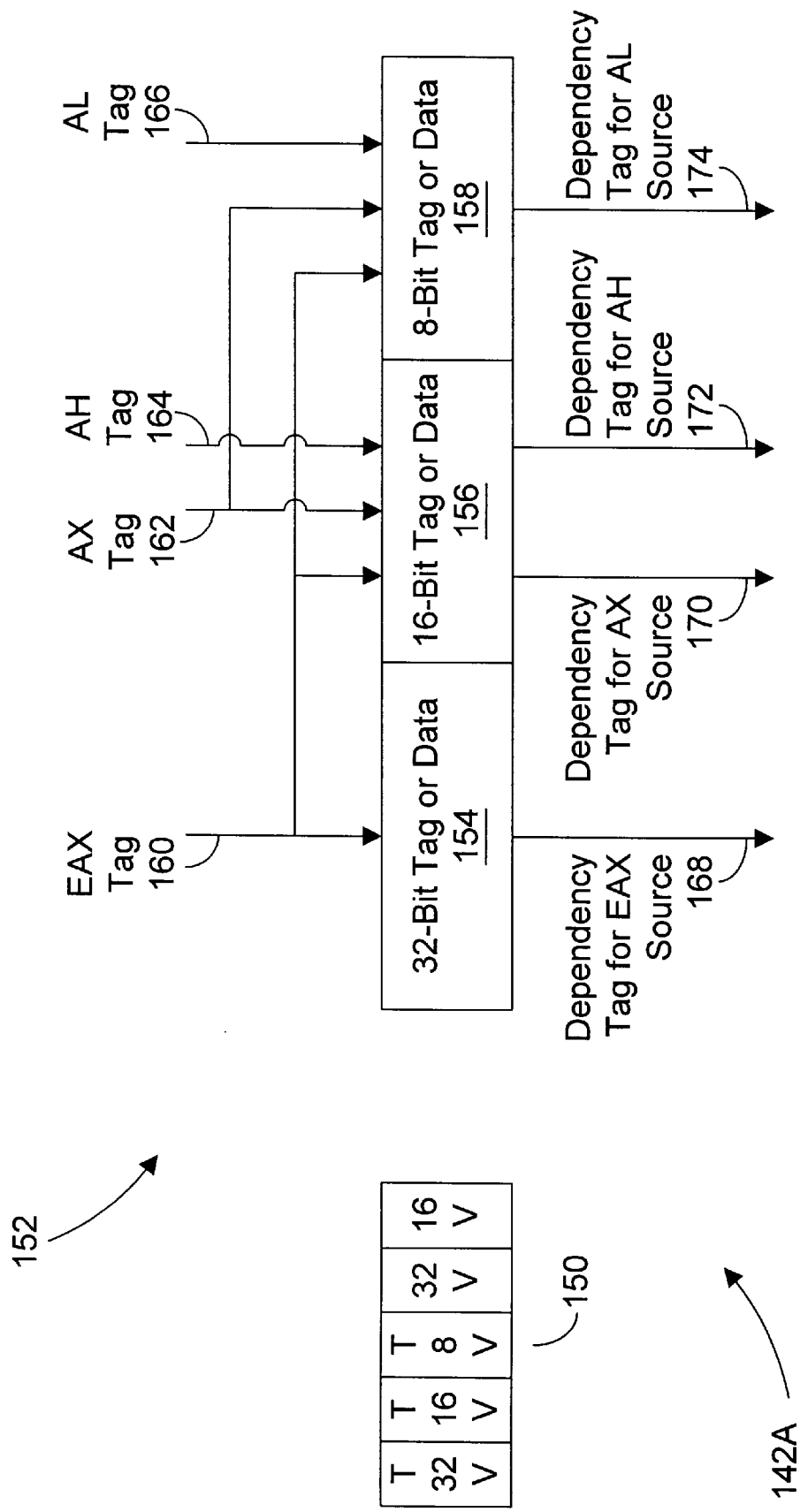
FIG. 12 is a diagram illustrating one embodiment of a future file storage location.

Turning next to FIG. 12, a diagram illustrating a storage location 142A of future file 140 is shown according to one implementation of future file 140. Other implementations are contemplated. The implementation shown in FIG. 12 may be employed for embodiments of microprocessor 10 employing the x86 microprocessor architecture. In the implementation shown, storage location 142A corresponds to the EAX register. Other storage locations 142 may be configured similarly.

Because the x86 microprocessor architecture allows for updates and accesses of portions of the EAX register, the value corresponding to the EAX register at any given clock cycle may be a combination of one or more reorder buffer tags as well as data. For the embodiment shown in FIG. 12, storage location 142A comprises a tag validity field 150 as well as a storage field 152. For the embodiment shown, tag validity field 150 comprises 5 bits, although other embodiments may include different numbers of bits. Similarly, storage field 152 comprises 32 bits in the embodiment shown although other embodiments may employ other numbers of bits. Storage field 152 is divided into a first tag or data portion 154, a second tag or data portion 156, and a third tag or data portion 158.

First tag or data portion 154 stores a reorder buffer tag or data corresponding to the most significant two bytes of the EAX register. Therefore, a reorder buffer tag stored in first portion 154 corresponds to an instruction having the EAX register as a destination operand. Similarly, second tag or data portion 156 stores a reorder buffer tag or data corresponding to the more significant byte of the least significant two bytes of the EAX register. Therefore, a reorder buffer tag stored in second portion 156 corresponds to an instruction having the EAX, AX, or AH register as a target. Finally, third tag or data portion 158 stores a reorder buffer tag or data corresponding to the less significant byte of the least significant two bytes of the EAX register. Therefore, a reorder buffer tag stored in third portion 158 corresponds to an instruction having the EAX, AX, or AL register as a target.

Arrows 160, 162, 164, and 166 indicate which portions of storage field 152 are updated when an instruction is dispatched which has the EAX register or a portion thereof as a destination operand. An instruction updating the EAX register updates the entire register. Therefore, the reorder buffer tag of an instruction having EAX as a destination operand is stored into each of first portion 154, second portion 154, and third portion 156 (arrow 160). Conversely, an instruction having the AX register as a destination operand updates the least two significant bytes of the EAX register. Therefore, the reorder buffer tag of an instruction having AX as a destination operand is stored into second portion 156 and third portion 158 (arrow 162). First portion 154 is thereby unmodified from the value stored therein prior to dispatch of the instruction having AX as a destination. Instructions which update the AH and AL registers update second portion 156 and third portion 158, respectively (arrows 164 and 166).

Arrows 168, 170, 172, and 174 indicate the source for the reorder buffer tag used by an instruction having the EAX register (or a portion thereof) as a source operand. First portion 154 is used to provide the reorder buffer tag if the EAX register is a source operand (arrow 168). Second portion 156 is used to provide the reorder buffer tag if the AX or AH register is a source operand (arrows 170 and 172). Finally, third portion 158 is used to provide the reorder buffer tag if the AL register is a source operand (arrow 174). The receiving reservation station 22 selects the appropriate reorder buffer tag based upon tag validity information and operand size information. Future file 140 provides the contents of storage location 142A upon operands/tags bus 144.

Tag validity field 150 is used to indicate if a particular portion of storage field 152 is storing a tag or data, as well as to indicate narrow-to-wide dependencies. As shown in FIG. 12, tag validity field 150 comprises five bits: a T32V bit, a T16V bit, a T8V bit, a 32V bit, and a 16V bit. The T32V bit is set when first portion 154 is storing a tag, and is clear when first portion 154 is storing data. Similarly, the T16V bit and the T8V bit indicate the contents of second portion 156 and third portion 158, respectively. The T32V, T16V, and T8V bits are set when a tag is stored into the respective portions. The bits are cleared when the corresponding data is provided, in accordance with the LIB bits within FIFO buffer 92A.

For example, a first instruction may have the EAX register as a destination operand. Therefore, the reorder buffer tag of the first instruction is stored into first, second, and third portions 154, 156, and 158. Accordingly, each of the T32V, T16V, and T8V bits are set. Additionally, the LIB bits of the first instruction are set within FIFO buffer 92A. A second instruction may subsequently be dispatched. The second instruction may have the AX register as a destination operand. Therefore, the reorder buffer tag of the second instruction is stored into second portion 156 and third portion 158. The LIB bits corresponding to second portion 156 and third portion 158 are set for the second instruction and cleared for the first instruction. When the instruction result is provided for the first instruction, the LIB bit corresponding to first portion 154 is set. Therefore, first portion 154 is updated and T32V bit is cleared. However, second portion 156 and third portion 158 are not updated since the corresponding LIB bits of the first instruction are clear.

The 32V bit and the 16V bit are used to indicate narrow-to-wide dependencies for 32 bit operands (32V bit) and 16 bit operands (16V bit). If the 32V bit is clear, then a 32-bit access to the corresponding register experiences a narrow-to-wide dependency. Similarly, if the 16V bit is clear than a 16-bit access experiences a narrow-to-wide dependency. Instruction dispatch is stalled upon detection of a narrow-to-wide dependency. However, because the value of the register is assembled within future file 140 as instruction results are stored therein, the narrow-to-wide dependency is resolved upon execution of the instruction which updates the narrower register. Previously, the narrow-to-wide dependency was resolved (i.e. the dispatch stall released) upon retirement of the instruction which updates the narrower register.

In another embodiment, if a narrow-to-wide dependency is detected, the dependency information is forwarded when only one reorder buffer tag remains valid within the future file. The receiving reservation station may collect the remaining data upon detection of the reorder buffer tag upon results buses 38. In still another embodiment, instruction dispatch is not stalled on a narrow-to-wide dependency. Instead, storage field 152 and tag validity field 150 are forwarded upon operands/tags bus 144. Reservation stations 22 detect each valid reorder buffer tag within the value provided and collect results from result bus 38.

The 32V bit is set whenever an instruction which updates the EAX register is dispatched. Upon dispatch of an instruction which updates the AX, AH, or AL registers, the 32V bit is cleared. Similarly, the 16V bit is set upon dispatch of an instruction which updates either the EAX or AX registers. The 16V bit is cleared upon dispatch of an instruction which updates the AH or AL registers.

It is noted that the "program order" has been used above to describe the order of instructions within reorder buffer 32, the order of instructions dispatched, etc. In embodiments of microprocessor 10 which employ speculative instruction fetching and execution, the program order of instructions is a predicted program order. The actual program order upon execution of the instructions may change. For example, branch misprediction or exception events may cause a change in the actual program order. Therefore, the term program order may be taken to mean "predicted program order" or "speculative program order" for such embodiments.

Figure 13:
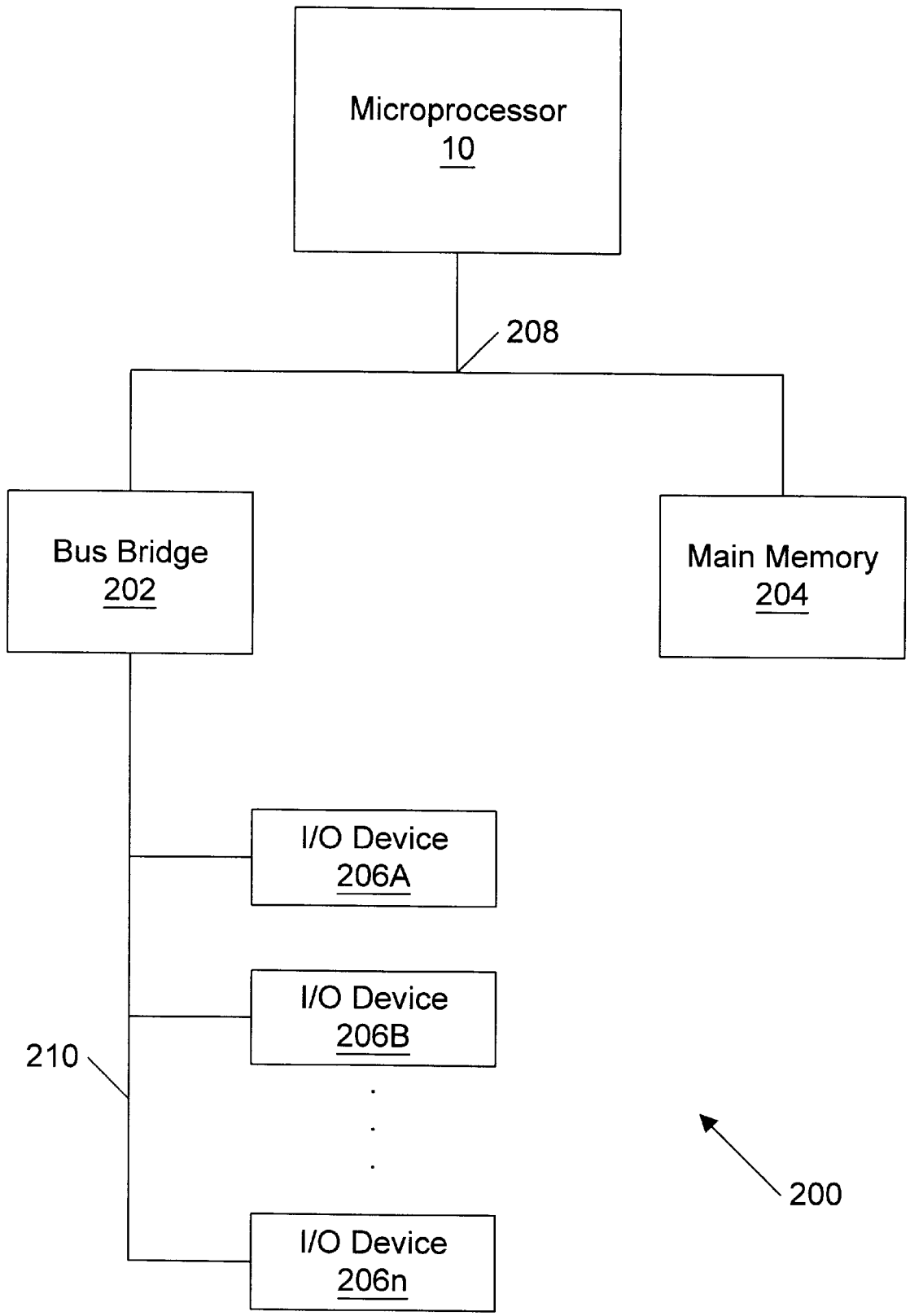
FIG. 13 is a block diagram of a computer system employing the microprocessor shown in FIG. 1.

Turning now to FIG. 13, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 13 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

Although the x86 microprocessor architecture is used in certain illustrative embodiments above as a specific example, the present invention is not limited to this architecture. Conversely, the present invention may be useful in embodiments of microprocessor 10 employing any microprocessor architecture. Certain portions of the present invention are believed to be particularly useful in microprocessor architectures which allow update and access to portions of registers defined therein (as opposed to allowing update and access to only the entirety of each register). It is further noted that, as opposed to a FIFO buffer as described above, instruction storages similar to instruction storage 92 may employ a plurality of storage locations which are not shifted. Instead, read and write pointers are used to indicate the next storage location to be allocated to a set of concurrently decoded instructions and to indicate the bottom of the reorder buffer, respectively.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| x86 Instruction | Instruction Category |
| --- | --- |
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |

TABLE 1-continued x86 Fast Path, Double Dispatch, and MROM Instructions

| x86 Instruction | Instruction Category |
|---|---|
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

In accordance with the above disclosure, a reorder buffer has been provided. The reorder buffer allocates and deallocates lines of storage, simplifying allocation and deallocation logic. Whenever instructions are dispatched, a fixed amount of storage is allocated and deallocated. The reorder buffer is shown in a microprocessor having fixed, symmetrical issue positions. Fixed, symmetrical issue positions are likely to generate large numbers of concurrently dispatched instructions, making efficient use of the line-oriented reorder buffer configuration. One embodiment of the reorder buffer employs a future file for simplified dependency checking and more efficient handling of narrow-to-wide dependencies.

Numerous variations and modifications will become apparent to those skilled in the art once the above disclosure is fully appreciated. It is intended that the following claims be interpreted to embrace all such variations and modifications.

What is claimed is:

1. A superscalar microprocessor comprising:
   a plurality of fixed, symmetrical issue positions coupled to receive instructions, wherein an instruction received by one of said plurality of issue positions remains within said one of said plurality of issue positions until an execution of said instruction is completed within said one of said plurality of issue positions; and
   a reorder buffer coupled to receive operand information regarding a plurality of concurrently dispatched instructions from said plurality of fixed, symmetrical issue positions, wherein said reorder buffer is configured to allocate storage for instruction results corresponding to said plurality of concurrently dispatched instructions.

2. The superscalar microprocessor as recited in claim 1 wherein said reorder buffer is configured to allocate a fixed amount of storage upon receipt of said plurality of concurrently dispatched instructions, regardless of a number of said plurality of concurrently dispatched instructions.

3. The superscalar microprocessor as recited in claim 2 wherein said fixed amount of storage comprises an amount of storage capable of storing instruction results corresponding to a maximum number of said plurality of concurrently dispatched instructions.

4. The superscalar microprocessor as recited in claim 3 wherein said reorder buffer includes a buffer comprising multiple lines of storage, wherein each one of said multiple lines of storage comprises said fixed amount of storage.

5. The superscalar microprocessor as recited in claim 4 wherein said reorder buffer is configured to retire a line of storage upon receipt of an instruction result for each of said plurality of concurrently dispatched instructions stored within said line of storage.

6. The superscalar microprocessor as recited in claim 5 further comprising a register file coupled to said reorder buffer, wherein said reorder buffer retires a line of storage by storing the corresponding instruction results into said register file.

7. The superscalar microprocessor as recited in claim 1 wherein said reorder buffer is configured to check dependencies of source operands indicated by said operand information against instruction results stored within said reorder buffer.

8. The superscalar microprocessor as recited in claim 7 wherein said reorder buffer is configured to detect a particular instruction which updates a particular source operand.

9. The superscalar microprocessor as recited in claim 8 wherein said particular instruction updates said particular source operand and said particular instruction is flagged as the last instruction in program order within said reorder buffer to update said particular source operand.

10. The superscalar microprocessor as recited in claim 1 wherein each one of said plurality of issue positions comprises a decode unit configured to decode an instruction.

11. The superscalar microprocessor as recited in claim 10 wherein said decode unit comprises an early decode unit configured to detect said operand information corresponding to said instruction and to convey said operand information to said reorder buffer.

12. The superscalar microprocessor as recited in claim 11 wherein said decode unit further comprises an opcode decode unit coupled to receive said instruction from said early decode unit wherein said opcode decode unit is configured to decode an opcode of said instruction.

13. The superscalar microprocessor as recited in claim 12 wherein said each one of said plurality of issue positions further comprises a reservation station coupled to said opcode decode unit, wherein said reservation station is configured to store said instruction prior to instruction execution.

14. The superscalar microprocessor as recited in claim 13 wherein said each one of said plurality of issue positions further comprises a functional unit coupled to said reservation station, wherein said functional unit is configured to execute said instruction.

15. The superscalar microprocessor as recited in claim 14 wherein said functional unit is further configured to convey an instruction result corresponding to said instruction to said reorder buffer upon execution of said instruction.

16. A superscalar microprocessor comprising:
   a first decode unit configured to decode a first instruction;
   a second decode unit configured to decode a second instruction concurrently with said first decode unit decoding said first instruction;
   a first reservation station coupled to receive said first instruction from said first decode unit, wherein said first reservation station is configured to store said first instruction until said first instruction is executed;

a second reservation station coupled to receive said second instruction from said second decode unit, wherein said second reservation station is configured to store said second instruction until said second instruction is executed; and a reorder buffer coupled to said first decode unit and said second decode unit, wherein said reorder buffer receives an indication of said first instruction and said second instruction from said first decode unit and said second decode unit respectively, and wherein said reorder buffer is configured to allocate a line of storage to store a first instruction result corresponding to said first instruction and a second instruction result corresponding to said second instruction, and wherein said line of storage comprises a fixed amount of storage capable of storing instruction results corresponding to a maximum number of concurrently dispatchable instructions.

17. The superscalar microprocessor as recited in claim 16 further comprising a first functional unit coupled to said first reservation station, wherein said first functional unit is configured to execute said first instruction and to provide said first instruction result to said reorder buffer.

18. The superscalar microprocessor as recited in claim 17 wherein said reorder buffer is configured to associate said first instruction result with said first instruction due to receiving said first instruction result from said first functional unit.

19. The superscalar microprocessor as recited in claim 18 wherein said first functional unit further provides a line tag identifying said line of storage within said reorder buffer.

20. A superscalar microprocessor, comprising:

a first functional unit configured to execute instructions;

a second functional unit configured to execute instructions; and a reorder buffer including storage for instruction results corresponding to instructions outstanding within the superscalar microprocessor, said storage comprising a first plurality of entries preassigned to said first functional unit and a second plurality of entries preassigned to said second functional unit, wherein said reorder buffer is configured to allocate one of said first plurality of entries to a first instruction upon dispatch of said first instruction to said first functional unit, and wherein said reorder buffer is configured to allocate one of said second plurality of entries to a second instruction upon dispatch of said second instruction to said second functional unit.

21. The superscalar microprocessor as recited in claim 20 wherein said microprocessor comprises a plurality of symmetrical functional units including said first functional unit and said second functional unit.

22. The superscalar microprocessor as recited in claim 20 wherein said storage is further organized as a plurality of lines of storage, wherein said reorder buffer is configured to allocate one of said plurality of lines of storage upon dispatch of at least one instruction, and wherein each one of said plurality of lines of storage comprises one of said first plurality of entries and one of said second plurality of entries.

23. The superscalar microprocessor as recited in claim 22 wherein said reorder buffer is configured to allocate, upon dispatch of said first instruction and a lack of dispatch of said second instruction, one of said plurality of lines of storage and said one of said second plurality of entries within said one of said plurality of lines of storage is empty.

* * * * *

UNITED STATES PATENT AND TRADEMARK OFFICE
CERTIFICATE OF CORRECTION

PATENT NO. : 5,901,302
DATED : May 4, 1999
INVENTOR(S) : David B. Witt, et. al.

It is certified that error appears in the above-indentified patent and that said Letters Patent is hereby corrected as shown below:

Claim 1, col. 35, line 60, between "instructions" and ".", please insert--, and wherein said reorder buffer is configured to allocate a fixed amount of storage upon receipt of said plurality of concurrently dispatched instructions, regardless of a number of said plurality of concurrently dispatched instructions--.

Claim 2, column 35, lines 61 - 65, please delete claim 2 in its entirety.

Claim 3, column 35, line 66, after "claim", please delete "2" and insert --1-- in place thereof.

Signed and Sealed this

Nineteenth Day of October, 1999

Attest:

Q. TODD DICKINSON

Attesting Officer

Acting Commissioner of Patents and Trademarks